US012771769B2

(12) United States Patent
Guan et al.

(10) Patent No.: US 12,771,769 B2
(45) **Date of Patent: *Oct. 20, 2026**

(54) FOLDING APPARATUS AND ELECTRONIC DEVICE

(71) Applicant: HUAWEI TECHNOLOGIES CO., LTD., Shenzhen (CN)

(72) Inventors: Chenghao Guan, Shanghai (CN); WenJie Jiang, Shanghai (CN); Linhui Niu, Shanghai (CN); Zekun Gong, Nanjing (CN); Zhengyi Xu, Shanghai (CN); Gangchao Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 267 days.

This patent is subject to a terminal disclaimer.

(21) Appl. No.: 18/695,989

(22) PCT Filed: Sep. 19, 2022

(86) PCT No.: PCT/CN2022/119663

§ 371 (c)(1),
(2) Date: Mar. 27, 2024

(87) PCT Pub. No.: WO2023/051306

PCT Pub. Date: Apr. 6, 2023

(65) Prior Publication Data

US 2024/0396986 A1 Nov. 28, 2024

(30) Foreign Application Priority Data

Sep. 28, 2021 (CN) .......................... 202111145797.0

(51) Int. Cl.
*H04M 1/02* (2006.01)
*G06F 1/16* (2006.01)

(52) U.S. Cl.
CPC ........ *H04M 1/0268* (2013.01); *G06F 1/1624* (2013.01); *G06F 1/1652* (2013.01); *H04M 1/022* (2013.01)

(58) Field of Classification Search
CPC .. H04M 1/0268; H04M 1/022; H04M 1/0216; G06F 1/1624; G06F 1/1652;
(Continued)

(56) References Cited

U.S. PATENT DOCUMENTS

| | | | | |
|---|---|---|---|---|
| 12,425,500 | B2 * | 9/2025 | Xu | H04M 1/0216 |
| 2024/0069604 | A1 | 2/2024 | Xu et al. | |

FOREIGN PATENT DOCUMENTS

| | | | |
|---|---|---|---|
| CN | 112449525 | A | 3/2021 |
| CN | 112901643 | A | 6/2021 |
| CN | 113225412 | A | 8/2021 |

OTHER PUBLICATIONS

Extended European Search Report in European Appln. No. 22874693.9, mailed on Oct. 21, 2024, 10 pages.

(Continued)

*Primary Examiner* — Eugene Yun
(74) *Attorney, Agent, or Firm* — Fish & Richardson P.C.

(57) ABSTRACT

Example folding apparatus and electronic devices are described. In one example, a folding apparatus includes a first housing, a rotating mechanism, and a second housing that are sequentially connected. The rotating mechanism drives the first housing and the second housing to be folded or unfolded relative to each other. The rotating mechanism includes a main shaft assembly, a first transmission arm, a first rotating arm, a first shielding member, a second transmission arm, a second rotating arm, and a second shielding member. When the folding apparatus is unfolded, the first shielding member and the second shielding member approach each other to shield the main shaft assembly.

18 Claims, 37 Drawing Sheets

(58) Field of Classification Search
CPC ...... G06F 1/1656; G06F 1/1681; F16C 11/04; F16C 11/12
USPC ........................................................ 455/566
See application file for complete search history.

(56) References Cited

OTHER PUBLICATIONS

International Search Report and Written Opinion in International Appln. No. PCT/CN2022/119663, mailed on Dec. 16, 2022, 17 pages (with English translation).

* cited by examiner

FOLDING APPARATUS AND ELECTRONIC DEVICE

CROSS-REFERENCE TO RELATED APPLICATIONS

This is a National Stage of International Patent Application No. PCT/CN2022/119663 filed on Sep. 19, 2022, which claims priority to Chinese Patent Application No. 202111145797.0 filed on Sep. 28, 2021. Both of the aforementioned applications are hereby incorporated by reference in their entireties.

This application claims priority to Chinese Patent Application No. 202111145797.0, filed with the China National Intellectual Property Administration on Sep. 28, 2021, and entitled "FOLDING APPARATUS AND ELECTRONIC DEVICE", which is incorporated herein by reference in its entirety.

TECHNICAL FIELD

This application relates to the field of electronic product technologies, and in particular, to a folding apparatus and an electronic device.

BACKGROUND

Flexible displays are widely applied to various foldable electronic devices because of characteristics such as lightness, thinness, and non-fragileness. The foldable electronic device further includes a folding apparatus configured to carry a flexible display, and the folding apparatus generally includes two housings and a rotating mechanism connected between the housings. Through deformation of the rotating mechanism, the two housings are folded or unfolded relative to each other and drive the flexible display to be folded or unfolded.

For folding or unfolding of a conventional folding apparatus, two or three shielding plates are usually disposed on a surface that is of the folding apparatus and that is away from a flexible display, to shield an internal part of the folding apparatus and ensure an appearance effect after an electronic device is unfolded. However, a structure of the shielding plate needs to adaptively slide with rotation of two housings, and the structure of the shielding plate is usually relatively complex. This is unfavorable for subsequent maintenance and replacement.

SUMMARY

This application provides a folding apparatus, to simplify a form of a shielding structure and facilitate subsequent maintenance and replacement of the shielding structure. This application further provides an electronic device equipped with the folding apparatus. Specifically, the following technical solutions are included.

According to a first aspect, this application provides a folding apparatus, including a first housing, a rotating mechanism, and a second housing that are sequentially connected. The rotating mechanism is capable of deforming, so that the first housing and the second housing are folded or unfolded relative to each other. The rotating mechanism includes a main shaft assembly, a first transmission arm, a first rotating arm, a first shielding member, a second transmission arm, a second rotating arm, and a second shielding member. One end of the first transmission arm is fixedly connected to the first housing, and the other end of the first transmission arm is rotatably connected to the main shaft assembly. The first rotating arm includes a first rotating end and a first sliding end, the first rotating end is rotatably connected to the main shaft assembly, and the first sliding end is slidably connected to the first transmission arm. The first shielding member is located on a side that is of the first rotating arm and that is away from the first transmission arm and is fixedly connected to the first sliding end. One end of the second transmission arm is fixedly connected to the second housing, and the other end of the second transmission arm is rotatably connected to the main shaft assembly. The second rotating arm includes a second rotating end and a second sliding end, the second rotating end is rotatably connected to the main shaft assembly, and the second sliding end is slidably connected to the second transmission arm. The second shielding member is located on a side that is of the second rotating arm and that is away from the second transmission arm and is fixedly connected to the second sliding end. When the first housing and the second housing are unfolded relative to each other, both the first sliding end and the second sliding end slide towards the main shaft assembly, and the first shielding member and the second shielding member are close to each other to shield the main shaft assembly.

In the folding apparatus in this application, folding and unfolding actions between the first housing and the second housing are implemented by using the rotating mechanism. The rotating mechanism includes the main shaft assembly, and the main shaft assembly is rotatably connected to the first housing through the first transmission arm, and is rotatably connected to the second housing through the second transmission arm. Rotatable connections between the first rotating arm and the main shaft assembly and between the second rotating arm and the main shaft assembly are used to enable the first shielding member to slide relative to the first transmission arm and the second shielding member to slide relative to the second transmission arm. In this way, when the first housing and the second housing are unfolded relative to each other, the first shielding member and the second shielding member can be close to each other, to shield the main shaft assembly, prevent external vapor or dust from intruding the inside of the folding apparatus, and improve an appearance effect of the folding apparatus.

In the folding apparatus of this application, the first shielding member and the second shielding member are respectively fastened on the first rotating arm and the second rotating arm, and are respectively located on a side that is of the first rotating arm and that is away from the main shaft assembly and a side that is of the second rotating arm and that is away from the main shaft assembly. The first shielding member and the second shielding member respectively slide with the first rotating arm and the second rotating arm, so that the first shielding member and the second shielding member slide relative to the main shaft assembly to achieve a shielding effect. The first shielding member and the second shielding member have relatively simple mechanism actions relative to the main shaft assembly, and the first shielding member and the second shielding member are always exposed at one side of the main shaft assembly. When subsequent maintenance and replacement need to be performed, the first shielding member or the second shielding member may be directly removed from the first rotating arm or the second rotating arm, and no further disassembly and assembly operations need to be performed on the folding apparatus, so that maintenance and replacement operations of the first shielding member and the second shielding member are relatively convenient.

In a possible implementation, the first rotating arm includes a first rotating member and a second rotating member, the first rotating member and the second rotating member are disposed at an interval in a length direction of the main shaft assembly, and the first shielding member is fixedly connected to both the first rotating member and the second rotating member. The second rotating arm includes a third rotating member and a fourth rotating member, the third rotating member and the fourth rotating member are disposed at an interval in the length direction of the main shaft assembly, and the second shielding member is fixedly connected to both the third rotating member and the fourth rotating member.

In this implementation, both the first shielding member and the second shielding member are in the shape of a long strip, and are disposed in the length direction of the main shaft assembly: Disposing the first rotating member and the second rotating member at an interval in the length direction of the main shaft assembly ensures that a connection between the first shielding member in the shape of a long strip and the first rotating arm is more stable, thereby ensuring a rotating posture of the first shielding member relative to the main shaft assembly. After the second shielding member is fixedly connected to both the third rotating member and the fourth rotating member, a rotating posture of the second shielding member relative to the main shaft assembly can also be ensured.

In a possible implementation, there are a plurality of first rotating members and a plurality of second rotating members, the plurality of first rotating members and the plurality of second rotating members are disposed at intervals in the length direction of the main shaft assembly, and the first shielding member is fixedly connected to the plurality of first rotating members and the plurality of second rotating members. There are also a plurality of third rotating members and a plurality of fourth rotating members, the plurality of third rotating members and the plurality of fourth rotating members are also disposed at intervals in the length direction of the main shaft assembly; and the second shielding member is fixedly connected to the plurality of third rotating members and the plurality of fourth rotating members.

In this implementation, the plurality of first rotating members and the plurality of second rotating members are disposed in the length direction of the main shaft assembly, to provide more fulcrums for the first shielding member and further ensure a rotating posture of the first shielding member. A structure of a plurality of third rotating members and a plurality of fourth rotating members further ensures a rotating posture of the second shielding member.

In a possible implementation, the first rotating member includes a first spring, two opposite ends of the first spring respectively abut against the first rotating end and the first sliding end, and the first spring is configured to push the first sliding end away from the first rotating end. The third rotating member includes a second spring, two opposite ends of the second spring respectively abut against the second rotating end and the second sliding end, and the second spring is configured to push the second sliding end away from the second rotating end.

In this implementation, the first spring may form abutting force between the first rotating end and the first sliding end. When the folding apparatus is unfolded, a relative position between the first rotating end and the first sliding end is maintained by using the abutting force. The second spring may also maintain a relative position between the second rotating end and the second sliding end. The folding apparatus can be folded and flipped only under external force that is sufficient to overcome the abutting force provided by the first spring and the second spring, so that the folding apparatus in an unfolded state maintains a stable posture.

In a possible implementation, the rotating mechanism further includes a first meshing member and a second meshing member. The first meshing member is located between the first shielding member and the first transmission arm, the first meshing member includes a third sliding end and a first meshing end that are opposite to each other, and the third sliding end is slidably connected to the first transmission arm. The second meshing member is located between the second shielding member and the second transmission arm, the second meshing member includes a fourth sliding end and a second meshing end that are opposite to each other, and the fourth sliding end is slidably connected to the second transmission arm. The first meshing end and the second meshing end are meshed with each other.

In this implementation, the first meshing member and the second meshing member are meshed with each other, so that the first housing and the second housing always maintain postures symmetrical to each other based on the main shaft assembly in a process of unfolding or folding. In addition, by using a mechanism action of synchronous unfolding or folding of the first housing and the second housing, a rotation stroke of operating the folding apparatus in this application by a user is shortened.

In a possible implementation, the first shielding member includes a first fastener and a first cover plate. The first fastener is fixedly connected to both the first rotating member and the second rotating member. The first cover plate is located on a side that is of the first fastener and that is away from the first rotating member, and is fixedly connected to the first fastener. The second shielding member includes a second fastener and a second cover plate. The second fastener is fixedly connected to both the third rotating member and the fourth rotating member. The second cover plate is located on a side that is of the second fastener and that is away from the third rotating member, and is fixedly connected to the second fastener.

In this implementation, the first fastener is fixedly connected to both the first rotating member and the second rotating member, so that position precision of the first shielding member relative to the first rotating arm may be ensured. The first cover plate is configured to shield the first shielding member. The second fastener is configured to ensure position precision of the second shielding member relative to the second rotating arm, and the second cover plate is configured to shield the second shielding member.

In a possible implementation, there are a plurality of first fasteners, the first fasteners are fixedly connected to several first rotating members and several second rotating members, and the first cover plate is fixedly connected to the plurality of first fasteners. There are a plurality of second fasteners, the second fasteners are fixedly connected to several third rotating members and several fourth rotating members, and the second cover plate is fixedly connected to the plurality of second fasteners.

In this implementation, the plurality of first fasteners may be disposed in the length direction of the main shaft assembly, and the first fasteners are fixedly connected to several first rotating members and several second rotating members, thereby reducing a requirement for overall dimension precision of the first fastener. A structure of the plurality of second fasteners also reduces a requirement for overall dimension precision of the folding apparatus, thereby helping reduce overall manufacturing costs of the folding apparatus.

In a possible implementation, a relative position between the first fastener and the first rotating member, and/or between the first fastener and the second rotating member, and/or between the second fastener and the third rotating member, and/or between the second fastener and the fourth rotating member is fastened through fitting between a positioning pin and a positioning hole.

In this implementation, the relative position between the first fastener and the first rotating member and/or the second rotating member is fastened through fitting between the positioning pin and the positioning hole. When relative positions between the first fasteners and several first rotating members and/or several second rotating members are fastened through fitting between positioning pins and positioning holes, precision of a relative position between the first fastener and the main shaft assembly can be ensured because the first rotating member and the second rotating member are disposed at an interval in the length direction of the main shaft assembly. Precision of a relative position between the second fastener and the main shaft assembly can also be ensured by using a similar positioning manner, so that position precision of the first shielding member and the second shielding member relative to the main shaft assembly is ensured.

In a possible implementation, the first cover plate is bonded and fastened to the first fastener, and the second cover plate is bonded and fastened to the second fastener.

In this implementation, a connection manner between the first cover plate and the first fastener facilitates separation between the first cover plate and the first fastener by using heating or the like, thereby implementing repeated disassembly and assembly or replacement operations between the first cover plate and the first fastener without damaging precision of the relative position between the first fastener and the main shaft assembly. Correspondingly, a connection manner between the second cover plate and the second fastener also facilitates repeated disassembly and assembly or replacement.

In a possible implementation, when the first housing and the second housing are unfolded relative to each other, a width of an interstice between the first shielding member and the second shielding member is narrower than or equal to 0.1 mm.

In this implementation, the width of the interstice between the first shielding member and the second shielding member is limited, so that the main shaft assembly is shielded by using the first shielding member and the second shielding member.

In a possible implementation, the main shaft assembly includes a central shaft plate and a first side shaft plate and a second side shaft plate respectively disposed on two sides of the central shaft plate. The first side shaft plate is connected between the central shaft plate and the first transmission arm, and the second side shaft plate is connected between the central shaft plate and the second transmission arm.

In this implementation, the first side shaft plate and the second side shaft plate are disposed, so that a bend radius of the main shaft assembly is increased. When the first housing and the second housing are folded relative to each other, shape thicknesses of the first housing and the second housing are accommodated.

In a possible implementation, the first side shaft plate is rotatably connected to the central shaft plate, and a rotation center of the first side shaft plate is close to the first transmission arm and away from the second side shaft plate. The second side shaft plate is rotatably connected to the central shaft plate, and a rotation center of the second side shaft plate is close to the second transmission arm and away from the first side shaft plate.

In this implementation, a specific spacing is formed between the rotation center of the first side shaft plate and the rotation center of the second side shaft plate, so that a bend radius of the main shaft assembly may be further increased. When the first housing and the second housing are folded relative to each other, the shape thicknesses of the first housing and the second housing are accommodated.

In a possible implementation, the first rotating arm is rotatably connected to the central shaft plate, and a rotation center of the first rotating arm is close to the first transmission arm and away from the second transmission arm. The second rotating arm is rotatably connected to the central shaft plate, and a rotation center of the second rotating arm is close to the second rotating arm and away from the first transmission arm.

In this implementation, a specific spacing is formed between the rotation center of the first rotating arm and the rotation center of the second rotating arm, so that a bend radius of the main shaft assembly corresponding to a region of the first rotating arm and the second rotating arm may be increased. When the first housing and the second housing are folded relative to each other, shape thicknesses of the first rotating arm and the second rotating arm are accommodated.

In a possible implementation, a rotatable connection is implemented between the first side shaft plate and the central shaft plate, and/or between the second side shaft plate and the central shaft plate, and/or between the first rotating arm and the central shaft plate, and/or between the second rotating arm and the central shaft plate through fitting between arc grooves and arc slide rails.

In a possible implementation, the central shaft plate includes a first side edge close to the first side shaft plate and a second side edge close to the second side shaft plate. A plurality of first arc grooves are disposed on the first side edge, and a plurality of second arc grooves are disposed on the second side edge. A plurality of first arc slide rails are disposed on the first side shaft plate, and each first arc slide rail is extended into one first arc groove, so that the first side shaft plate and the central shaft plate are rotatably connected. A plurality of second arc slide rails are disposed on the second side shaft plate, and each second arc slide rail is extended into one second arc groove, so that the second side shaft plate and the central shaft plate are rotatably connected.

In a possible implementation, a plurality of fifth arc grooves are further disposed on the first side edge, and a plurality of sixth arc grooves are disposed on the second side edge. A plurality of fifth arc slide rails are disposed on the first rotating end of the first rotating arm, and each fifth arc slide rail is extended into one fifth arc groove, so that the first rotating end and the central shaft plate are rotatably connected. A plurality of sixth arc slide rails are disposed on the second rotating end of the second rotating arm, and each sixth arc slide rail is extended into one sixth arc groove, so that the second rotating end and the central shaft plate are rotatably connected.

In a possible implementation, the central shaft plate includes a central inner plate and a central outer plate that are fixedly connected, and the central outer plate and the central inner plate are fastened to each other to form a plurality of arc grooves.

In a possible implementation, the first transmission arm includes a third side edge close to the first side shaft plate, a plurality of third arc grooves are disposed on the third side edge, a plurality of third arc slide rails are disposed on the first side shaft plate, and each third arc slide rail is extended into one third arc groove, so that the first side shaft plate and the first transmission arm are rotatably connected.

In a possible implementation, the second transmission arm includes a fourth side edge close to the second side shaft plate, a plurality of fourth arc grooves are disposed on the fourth side edge, a plurality of fourth arc slide rails are disposed on the second side shaft plate, and each fourth arc slide rail is extended into one fourth arc groove, so that the second side shaft plate and the second transmission arm are rotatably connected.

In a possible implementation, the first transmission arm further includes a plurality of first slide rails, the first rotating end of the first rotating arm includes a plurality of first sliding slots, and each first slide rail is extended into one first sliding slot to slidably connect the first rotating arm and the first transmission arm.

In a possible implementation, the second transmission arm further includes a plurality of second slide rails, the second rotating end of the second rotating arm includes a plurality of second sliding slots, and each second slide rail is extended into one second sliding slot to slidably connect the second rotating arm and the second transmission arm.

In a possible implementation, the first transmission arm includes a first transmission inner plate and a first transmission outer plate that are fixedly connected, and the first transmission inner plate and the first transmission outer plate are fastened to each other to form a plurality of arc grooves. The second transmission arm includes a second transmission inner plate and a second transmission outer plate that are fixedly connected, and the second transmission inner plate and the second transmission outer plate are fastened to each other to form a plurality of arc grooves.

According to a second aspect, this application provides an electronic device, including a flexible display and the folding apparatus provided in the first aspect of this application. The flexible display covers the folding apparatus, and is located on a side that is of a main shaft assembly and that is away from a first shielding member and a second shielding member.

It may be understood that, in the electronic device provided in this application, because the folding apparatus provided in the first aspect is used, when a first housing and a second housing are unfolded relative to each other, the main shaft assembly is properly shielded through fitting between the first shielding member and the second shielding member. Further, the first shielding member and the second shielding member are in positions that are always exposed outside the folding apparatus, and mechanism actions of the first shielding member and the second shielding member are relatively simple. This facilitates maintenance and replacement operations of the first shielding member and the second shielding member.

In a possible implementation, the flexible display includes a first non-bending portion, a bending portion, and a second non-bending portion that are sequentially disposed. Actually, the first non-bending portion is fastened to the first housing, and the second non-bending portion is fastened to the second housing. In a process in which the first housing and the second housing are folded or unfolded relative to each other, the bending portion is configured to perform adaptive deformation.

DESCRIPTION OF EMBODIMENTS

The following describes embodiments of this application with reference to accompanying drawings in embodiments of this application.

Embodiments of this application provide a folding apparatus and an electronic device. The electronic device includes the folding apparatus and a flexible display fastened to the folding apparatus. The folding apparatus may be unfolded to an unfolded state, may be folded to a folded state, or may be in an intermediate state between the unfolded state and the folded state. The flexible display is unfolded and folded with the folding apparatus. A main shaft assembly of the folding apparatus in the electronic device is optimized, so that relatively good sealing and shielding effects are implemented for the folding apparatus in any form of the unfolded state, the folded state, or the intermediate state. This prevents dust from intruding the folding apparatus and causing motion freezing, or prevents water vapor from intruding the electronic device and causing damage to an internal part. The folding apparatus and the electronic device in this application have relatively high reliability and relatively long service life.

Figure 1:
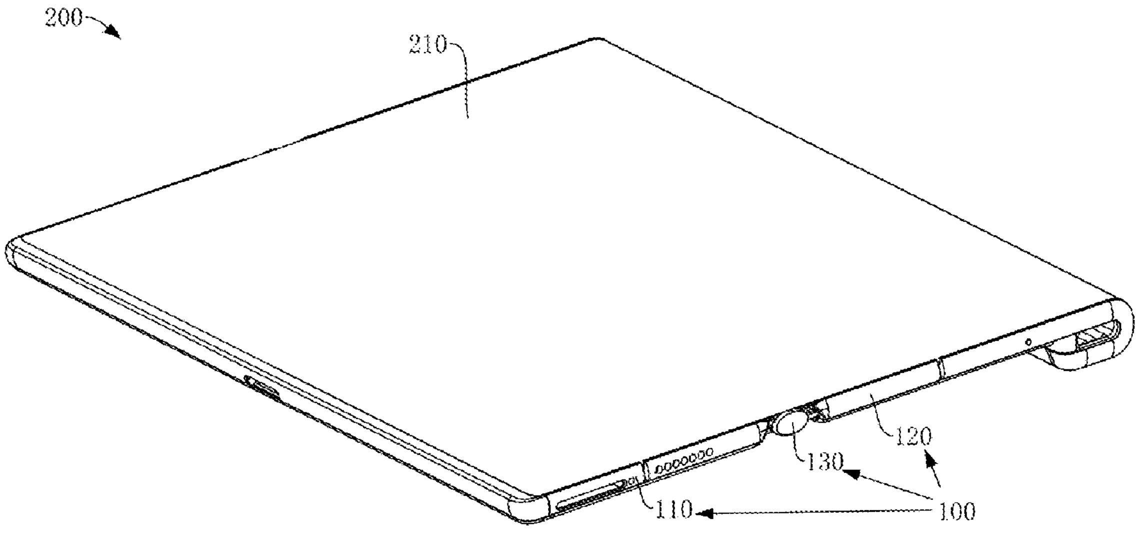
FIG. 1 is a schematic diagram of a structure of an electronic device in an unfolded form according to an embodiment of this application.
Figure 2:
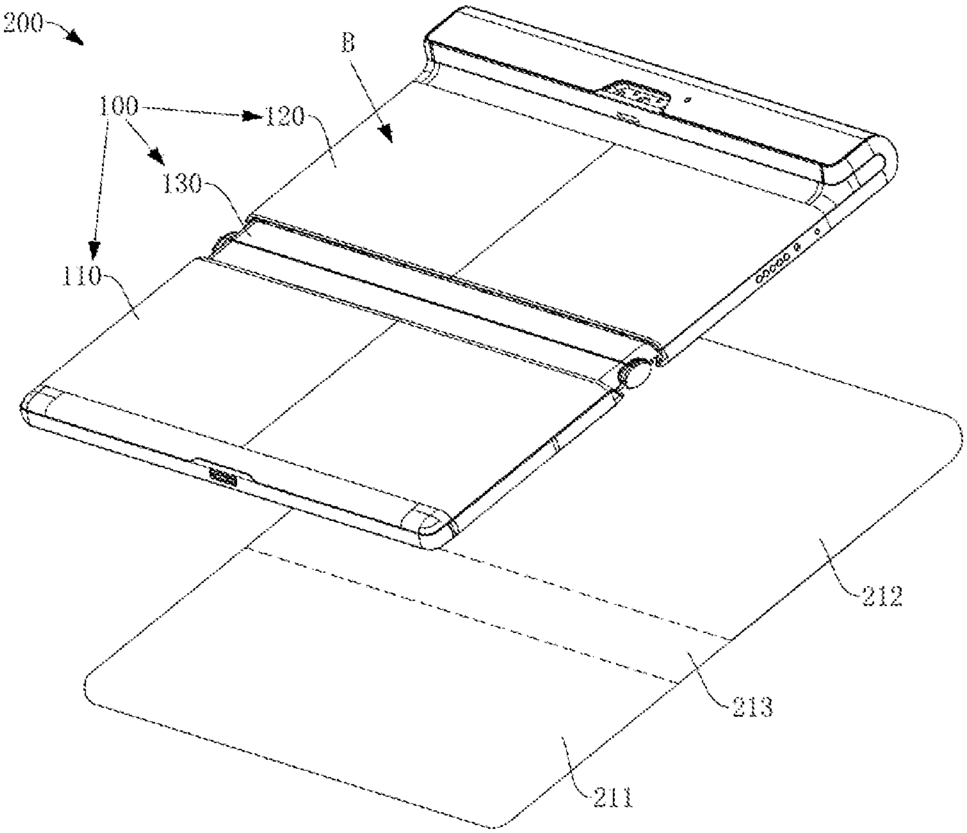
FIG. 2 is a schematic exploded view of a structure of the electronic device provided in FIG. 1.

As shown in FIG. 1 and FIG. 2, an embodiment of this application provides an electronic device 200. FIG. 1 is a schematic diagram of an appearance of the electronic device 200, and FIG. 2 is a partial schematic exploded view of the electronic device 200. The electronic device 200 includes a folding apparatus 100 and a flexible display 210 in this application. The folding apparatus 100 includes a first housing 110, a second housing 120, and a rotating mechanism 130. The first housing 110 and the second housing 120 are fixedly connected to two opposite sides of the rotating mechanism 130, respectively, and jointly form a support structure for the flexible display 210. In this embodiment of this application, an example in which the electronic device 200 is of a structure of outward display folding is used for description.

Figure 4:
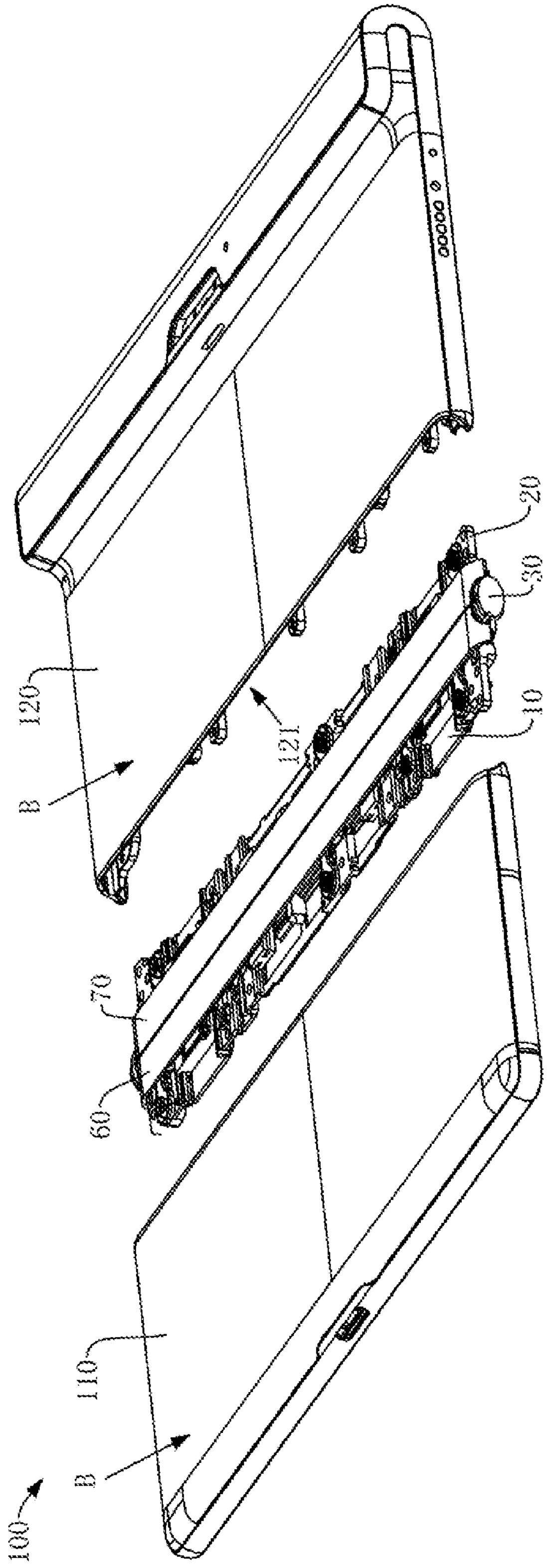
FIG. 4 is a schematic exploded view of parts of the folding apparatus shown in FIG. 2.

The rotating mechanism 130 includes a main shaft assembly 30, a first transmission arm 10, and a second transmission arm 20 (refer to FIG. 4). The first transmission arm 10 is fixedly connected to the first housing 110, and the second transmission arm 20 is fixedly connected to the second housing 120. The flexible display 210 includes a first non-bending portion 211, a bending portion 213, and a second non-bending portion 212 that are sequentially disposed. The flexible display 210 is fastened on the folding apparatus 100, including the first housing 110, the second housing 120, and the rotating mechanism 130. For example, the flexible display 210 may be fixedly connected through bonding by using an adhesive layer. The first non-bending portion 211 of the flexible display 210 is fastened to the first housing 110, the second non-bending portion 212 is fastened to the second housing 120, and the bending portion 213 correspondingly covers a position of the rotating mechanism 130 in the folding apparatus 100.

The rotating mechanism 130 is capable of deforming, so that the first transmission arm 10 and the second transmission arm 20 are folded or unfolded relative to each other and synchronously drive the first housing 110 and the second housing 120 to be folded or unfolded relative to each other. In this way, the flexible display 210 is folded and unfolded synchronously with the folding apparatus 100. The electronic device 200 shown in FIG. 1 and FIG. 2 is in a state in which the first housing 110 and the second housing 120 are unfolded relative to each other, and the flexible display 210 is also in a relative unfolded state. For example, when the first housing 110 and the second housing 120 are in a state of unfolded relative to each other with the first transmission arm 10 and the second transmission arm 20 that are unfolded relative to each other, approximately 180° (a slight deviation is allowed, for example, 165°, 177°, or 185°) is formed between the first housing 110 and the second housing 120. In this way, it may be regarded that the electronic device 200 is also in an unfolded form. When the flexible display 210 is in the unfolded state, full-screen display is supported and the electronic device 200 has a relatively large display area, thereby improving viewing experience of a user.

Figure 3:
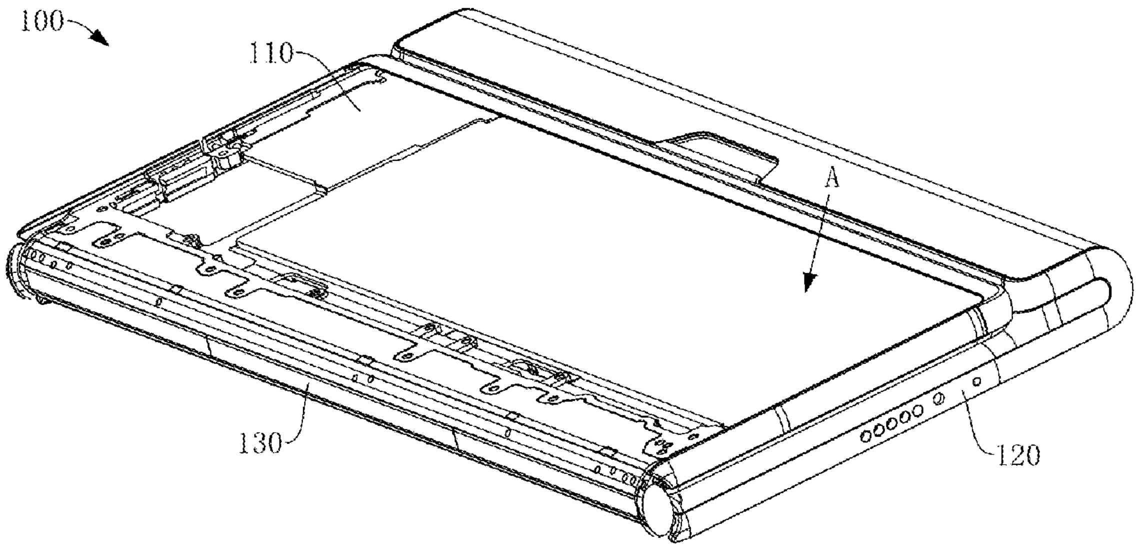
FIG. 3 is a schematic diagram of a structure of the folding apparatus shown in FIG. 2 when the folding apparatus is in a folded state.

Refer to FIG. 3. Under deformation of the rotating mechanism 130, the first housing 110 and the second housing 120 may further be folded relative to each other with the first transmission arm 10 and the second transmission arm 20 that are folded relative to each other. The first housing 110 and the second housing 120 can be fully closed to be parallel to each other (a slight deviation is also allowed). The folding apparatus 100 further includes an inner side surface B (refer to FIG. 2) and an outer side surface A that are opposite to each other, and a side used to carry the flexible display 210 is defined as the outer side surface A. When the first housing 110 and the second housing 120 are folded relative to each other, a side on which the first housing 110 and the second housing 120 are close to each other is defined as the inner side surface B.

Figure 3A:
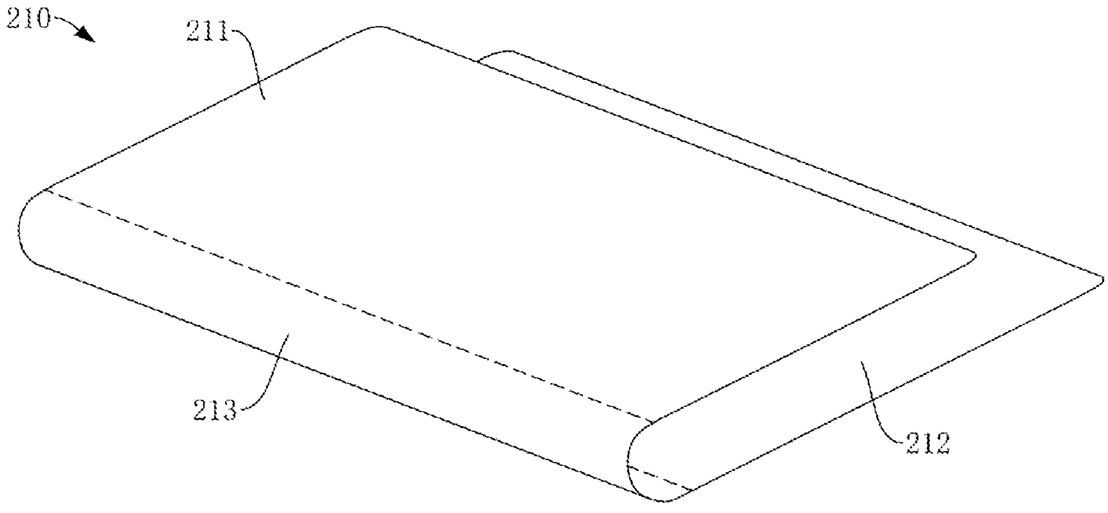
FIG. 3*a* is a schematic diagram of a structure of a flexible display of an electronic device when the folding apparatus shown in FIG. 3 is in a folded state.

Refer to FIG. 3*a*. Because the first non-bending portion 211 and the second non-bending portion 212 of the flexible display 210 are fixedly connected to the first housing 110 and the second housing 120, respectively, the flexible display 210 is approximately of a U-shaped structure with relative folding of the folding apparatus 100. Correspondingly, the electronic device 200 is also in a closed form because the first housing 110 and the second housing 120 are folded relative to each other.

For ease of description. FIG. 3 shows only the folded state of the folding apparatus 100. When the electronic device 200 is in the closed form, a planar size of the electronic device 200 is relatively small (with a relatively narrow width), so that it is convenient for a user to carry and store the electronic device 200.

The electronic device 200 in this application may be a product such as a mobile phone, a tablet computer, or a notebook computer. In this embodiment, an example in which the electronic device 200 is a mobile phone is used for description.

The flexible display 210 in this application may be an organic light-emitting diode (OLED) display: an active-matrix organic light-emitting diode (AMOLED) display, a mini light-emitting diode display: a micro light-emitting diode display, a micro organic light-emitting diode display, or a quantum dot light-emitting diode (QLED) display.

It may be understood that, in this embodiment, an example in which "a rotation center of the electronic device 200 is parallel to a width direction of the electronic device 200" is used for description. In this case, the electronic device 200 can rotate leftward or rightward, and folding and unfolding of the electronic device 200 affect a width of the electronic device 200. In some other embodiments, the rotation center of the electronic device 200 may alternatively be parallel to a length direction of the electronic device 200. In this case, the electronic device 200 can rotate upward and downward, and folding and unfolding of the electronic device 200 affect a length of the electronic device 200.

FIG. 4 is an exploded view of a structure of the folding apparatus 100.

As mentioned above, the folding apparatus 100 includes the first housing 110, the second housing 120, and the rotating mechanism 130. The rotating mechanism 130 includes the main shaft assembly 30, the first transmission arm 10, and the second transmission arm 20. One end of the first transmission arm 10 is rotatably connected to the main shaft assembly 30, and the other end of the first transmission arm 10 is fixedly connected to the first housing 110. The second transmission arm 20 is located on a side that is of the main shaft assembly 30 and that is away from the first transmission arm 10, one end of the second transmission arm 20 is rotatably connected to the main shaft assembly 30, and the other end of the second transmission arm 20 is fixedly connected to the second housing 120.

Specifically, both the first transmission arm 10 and the second transmission arm 20 are located on the outer side surface A of the folding apparatus 100. The first transmission arm 10 includes a first fastening portion 103 (refer to FIG. 29), and the second transmission arm 20) includes a second fastening portion 203 (refer to FIG. 29). The first fastening portion 103 is configured to be fixedly connected to a first fastening end 112 (refer to FIG. 29) of the first housing 110, and the second fastening portion 203 is configured to be fixedly connected to a second fastening end 122 (refer to FIG. 29) of the second housing 120. At a position of the inner side surface B of the folding apparatus 100, the rotating mechanism 130 further includes a first rotating arm 40 (refer to FIG. 6), a second rotating arm 50 (refer to FIG. 6), a first shielding member 60, and a second shielding member 70).

Figure 5:
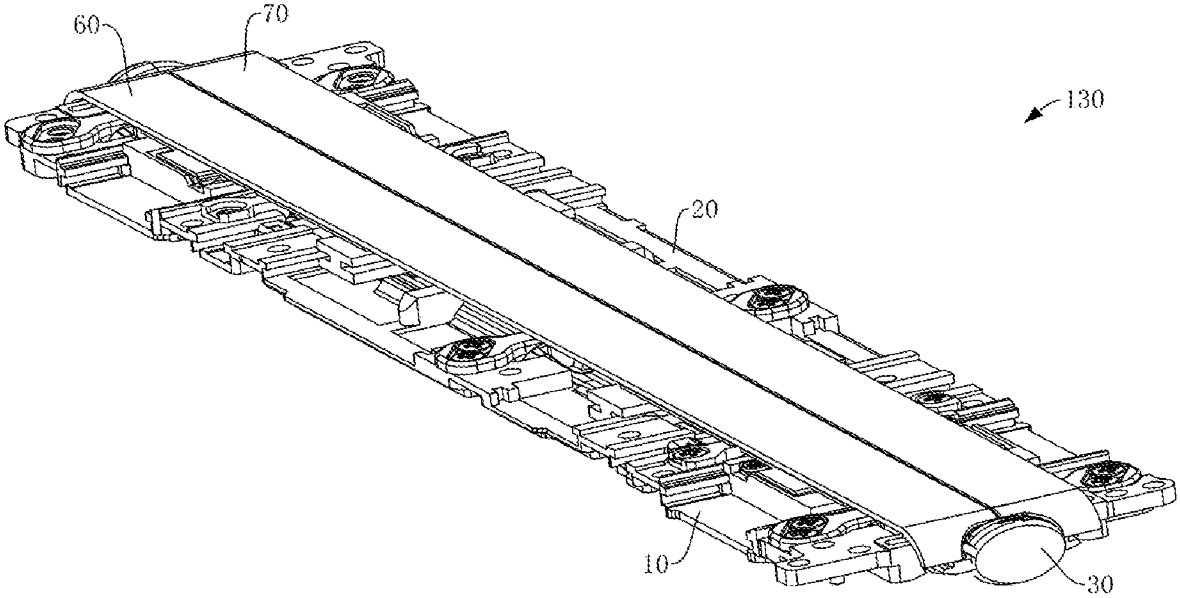
FIG. 5 is a schematic diagram of a structure of a rotating mechanism in the folding apparatus shown in FIG. 4.
Figure 6:
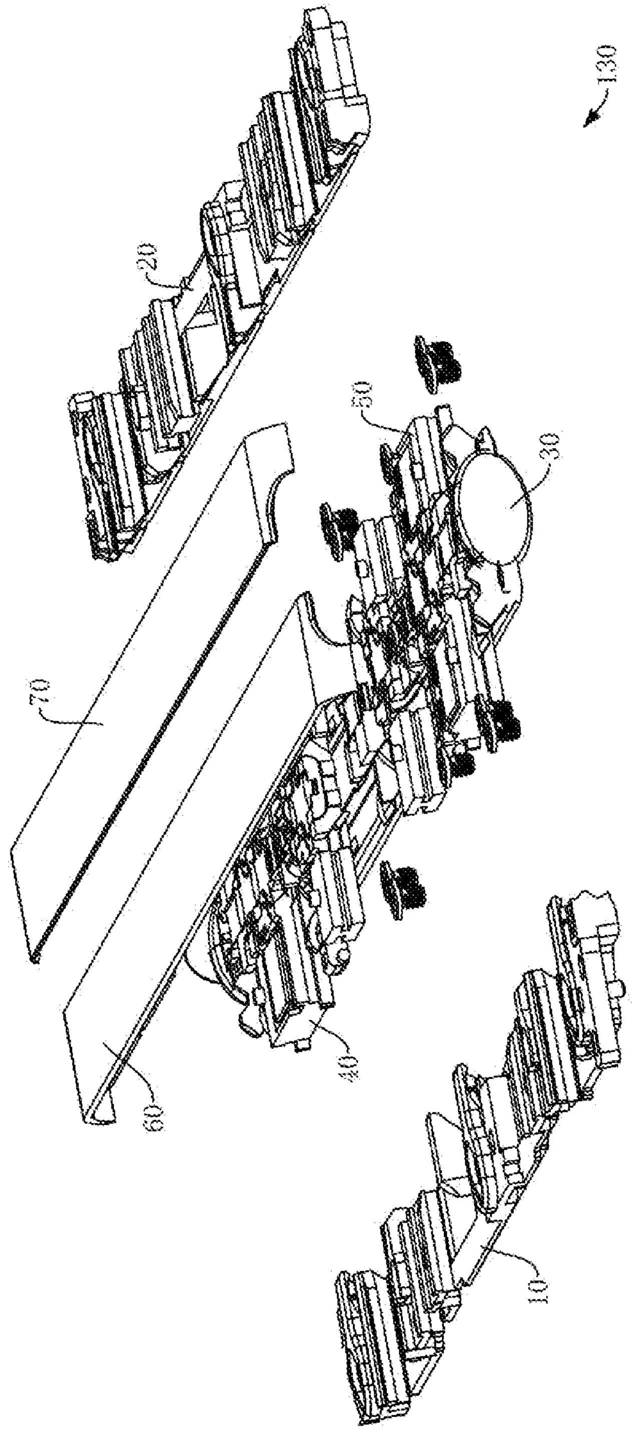
FIG. 6 is a schematic exploded view of a structure of a rotating mechanism in the folding apparatus shown in FIG. 5.

FIG. 5 and FIG. 6 are schematic diagrams of the rotating mechanism 130.

Both the first shielding member 60 and the first rotating arm 40 are located on a side that is of the main shaft assembly 30 and that is close to the first transmission arm 10, and the second shielding member 70) and the second rotating arm 50 are located on a side that is of the main shaft assembly 30 and that is close to the second transmission arm 20. Both the first shielding member 60) and the second shielding member 70) are located on the inner side surface B of the folding apparatus 100. The first rotating arm 40 is located between the first shielding member 60 and the first transmission arm 10, and is fixedly connected to the first shielding member 60. The second rotating arm 50 is located between the second shielding member 70 and the second transmission arm 20, and is fixedly connected to the second shielding member 70.

Figure 7:
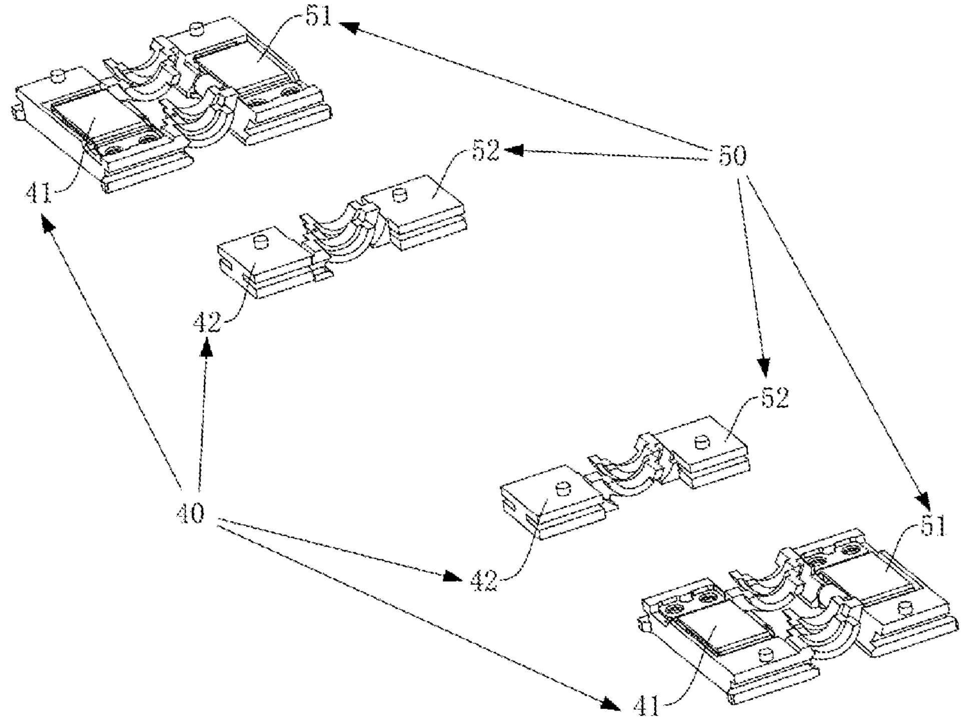
FIG. 7 is a schematic diagram of structures of a first rotating arm and a second rotating arm in the rotating mechanism shown in FIG. 5.

FIG. 7 is a schematic diagram of structures of the first rotating arm 40 and the second rotating arm 50.

Figure 8:
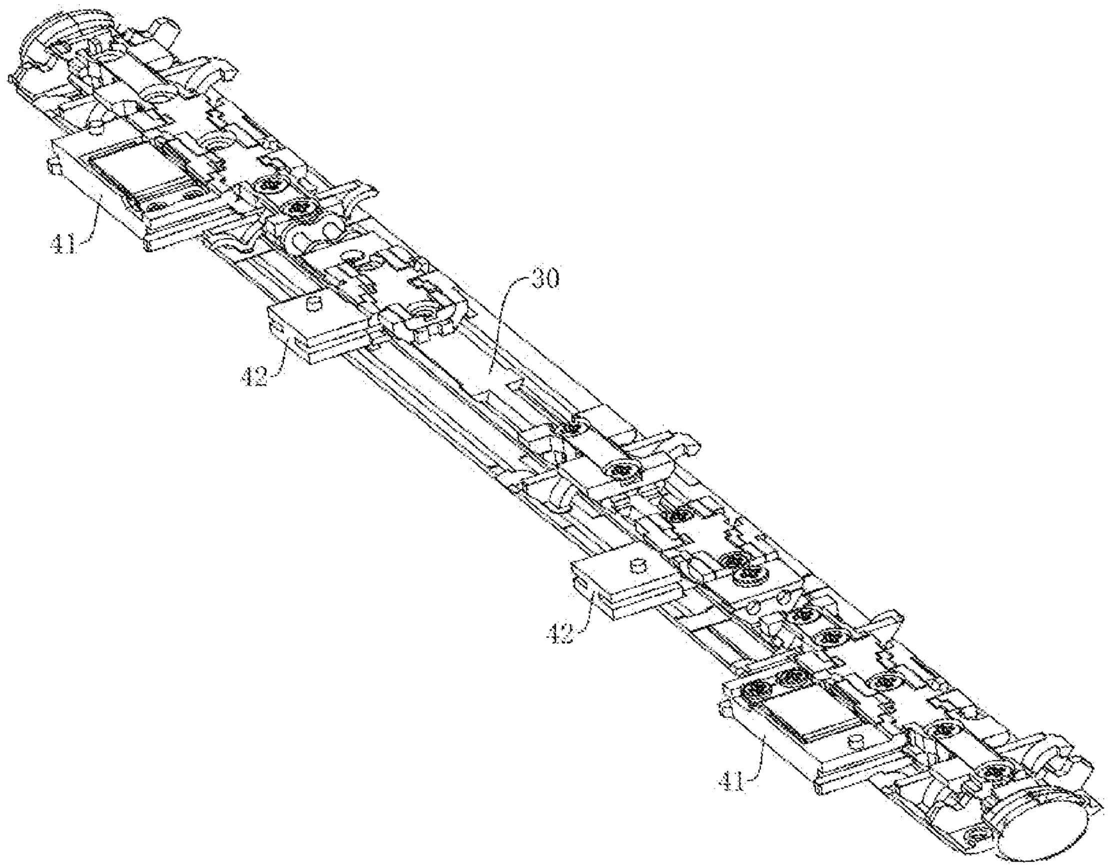
FIG. 8 is a schematic diagram of fitting between the first rotating arm shown in FIG. 7 and a main shaft assembly.
Figure 9:
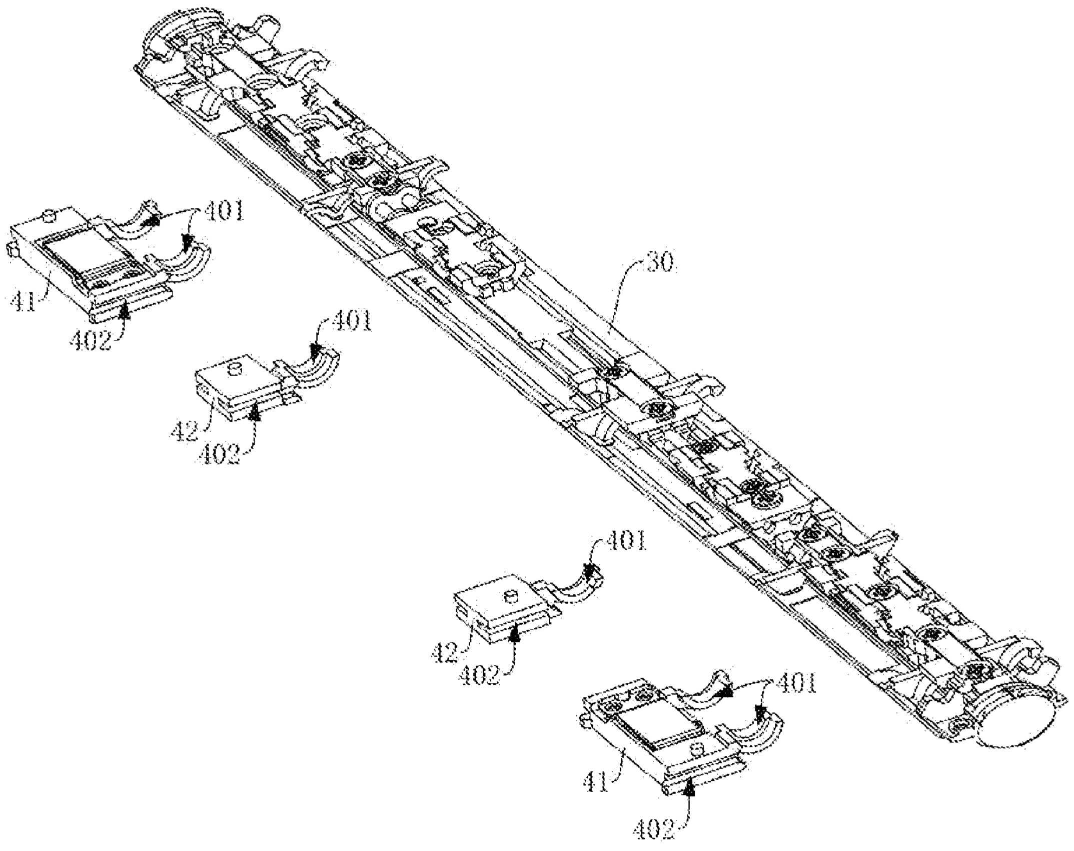
FIG. 9 is a schematic exploded view of fitting between the first rotating arm and the main shaft assembly shown in FIG. 8.

The first rotating arm 40 includes two first rotating members 41 and two second rotating members 42, and the two first rotating members 41 and the two second rotating members 42 are disposed at intervals in the length direction of the main shaft assembly 30. Further, refer to FIG. 8 and FIG. 9. The first rotating arm 40 further includes a first rotating end 401. The first rotating end 401 is distributed on each first rotating member 41 and each second rotating member 42, and the first rotating end 401 is located on a side that is of the first rotating arm 40 and that is close to the main shaft assembly 30. The first rotating arm 40 is rotatably connected to the main shaft assembly 30 through the first rotating end 401. The first rotating member 41 is rotatably connected to the main shaft assembly 30 through the first rotating end 401 disposed on the first rotating member 41 and near the main shaft assembly 30, and the second rotating member 42 is rotatably connected to the main shaft assembly 30 through the first rotating end 401 disposed on the second rotating member 42 and near the main shaft assembly 30.

The first rotating arm 40 further includes a first sliding end 402, the first sliding end 402 is located on a side that is of the first rotating arm 40 and that is away from the main shaft assembly 30, and the first sliding end 402 is also distributed on each first rotating member 41 and each second rotating member 42. On a side that is away from the main shaft assembly 30, the first rotating arm 40 is slidably connected to the first transmission arm 10 through the first sliding end 402. (Refer to detailed descriptions of subsequent embodiments and accompanying drawings.)

Through disposition of the foregoing connection relationship, the first rotating arm 40 may rotate relative to the main shaft assembly 30 and slide relative to the first transmission arm 10. In a process of folding or unfolding the folding apparatus 100 in this application, the first rotating arm 40 and the first transmission arm 10 may rotate relative to the main shaft assembly 30 through rotatable connections with the main shaft assembly 30. Because the first rotating arm 40 is closer to the inner side surface B of the folding apparatus 100 than the first transmission arm 10, a bend radius of the first rotating arm 40 is shorter than a bend radius of the first transmission arm 10. The first rotating arm 40) can slide relative to the first transmission arm 10, to compensate for a bend radius difference and achieve an effect that the first rotating arm 40 rotates synchronously with the first transmission arm 10.

The first rotating member 41 and the second rotating member 42 are disposed at an interval in the length direction of the main shaft assembly 30, and fulcrums for a rotatable connection between the first rotating arm 40 and the main shaft assembly 30 are increased. This may ensure that the first rotating arm 40 maintains a stable relative position with the main shaft assembly 30 in the length direction of the main shaft assembly 30 in a process of rotating relative to the main shaft assembly 30, and a rotation action of the entire first rotating arm 40 is relatively stable. It may be understood that, in other embodiments, a quantity of first rotating members 41 and a quantity of second rotating members 42 in the first rotating arm 40 may alternatively be set to other values, and arrangement manners of the first rotating member 41 and the second rotating member 42 may also be set different from arrangement manners shown in the figure, and a rotation action between the first rotating arm 40 and the main shaft assembly 30 is not affected.

Figure 10:
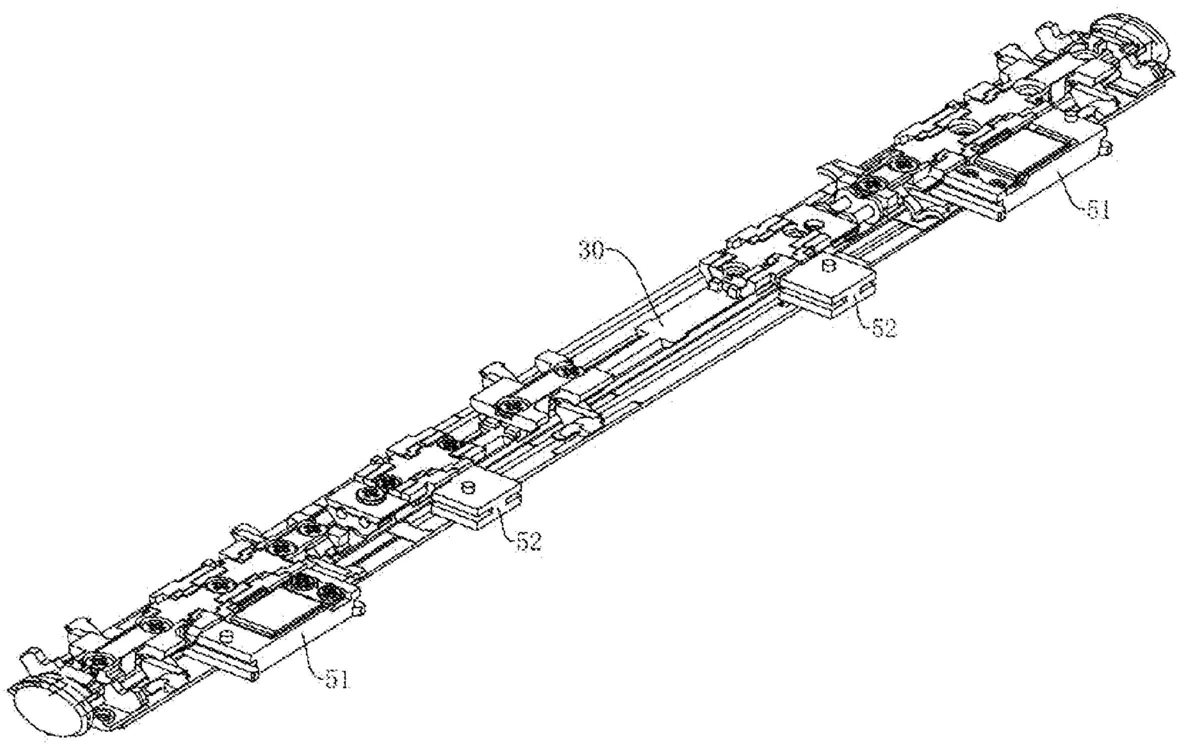
FIG. 10 is a schematic diagram of fitting between the second rotating arm shown in FIG. 7 and a main shaft assembly.
Figure 11:
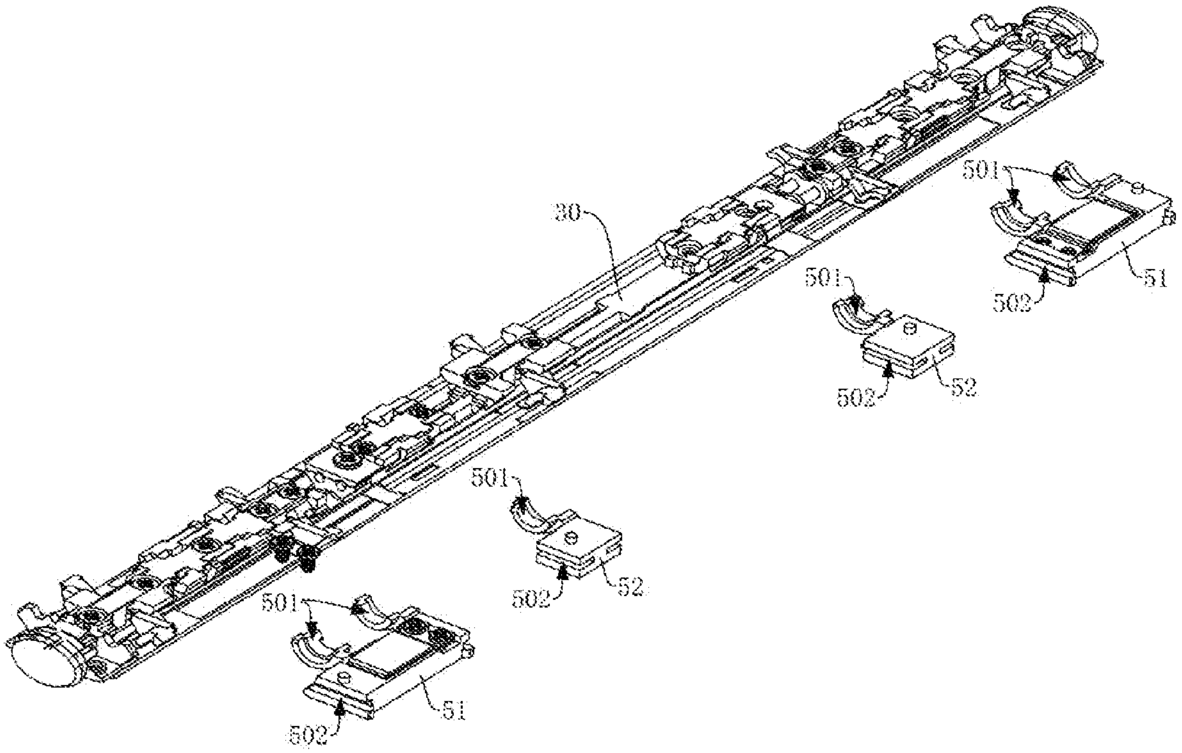
FIG. 11 is a schematic exploded view of fitting between the second rotating arm and the main shaft assembly shown in FIG. 10.

Refer to FIG. 7 again, and refer to FIG. 10 and FIG. 11. The second rotating arm 50 includes two third rotating members 51 and two fourth rotating members 52, and the two third rotating members 51 and the two fourth rotating members 52 are also disposed at intervals in the length direction of the main shaft assembly 30. The second rotating arm 50 further includes a second rotating end 501, the second rotating end 501 is distributed on each third rotating member 51 and each fourth rotating member 52, and the second rotating end 501 is located on a side that is of the second rotating arm 50 and that is close to the main shaft assembly 30. The second rotating arm 50 is rotatably connected to the main shaft assembly 30 through the second rotating end 501. The third rotating member 51 is rotatably connected to the main shaft assembly 30 through the second rotating end 501 disposed on the third rotating member 51 and near the main shaft assembly 30, and the fourth rotating member 52 is rotatably connected to the main shaft assembly 30 through the second rotating end 501 disposed on the fourth rotating member 52 and near the main shaft assembly 30.

The second rotating arm 50 further includes a second sliding end 502, the second sliding end 502 is located on a side that is of the second rotating arm 50 and that is away from the main shaft assembly 30, and the second sliding end 502 is also distributed on each third rotating member 51 and each fourth rotating member 52. On a side away from the main shaft assembly 30, the second rotating arm 50 is slidably connected to the second transmission arm 20 through the second sliding end 502. (Refer to detailed descriptions of subsequent embodiments and accompanying drawings.)

Through disposition of the foregoing connection relationship, the second rotating arm 50 may also rotate relative to the main shaft assembly 30 and slide relative to the second transmission arm 20. Similarly, because the second rotating arm 50 is closer to the inner side surface B of the folding apparatus 100 than the second transmission arm 20, the second rotating arm 50 can slide relative to the second transmission arm 20, to compensate for a bend radius difference and achieve an effect of rotating synchronously with the second transmission arm 20.

Similarly, the third rotating member 51 and the fourth rotating member 52 are disposed at an interval in the length direction of the main shaft assembly 30, and fulcrums for a rotatable connection between the second rotating arm 50 and the main shaft assembly 30 are also increased. This may ensure that a rotation action of the second rotating arm 50 is relatively stable. In another embodiment, a quantity of third rotating member 51 and a quantity of fourth rotating member 52 and arrangement manners of the third rotating member 51 and fourth rotating member 52 in the second rotating arm 50 may also be set differently, and a rotation action between the second rotating arm 50 and the main shaft assembly 30 is not affected.

Figure 12:
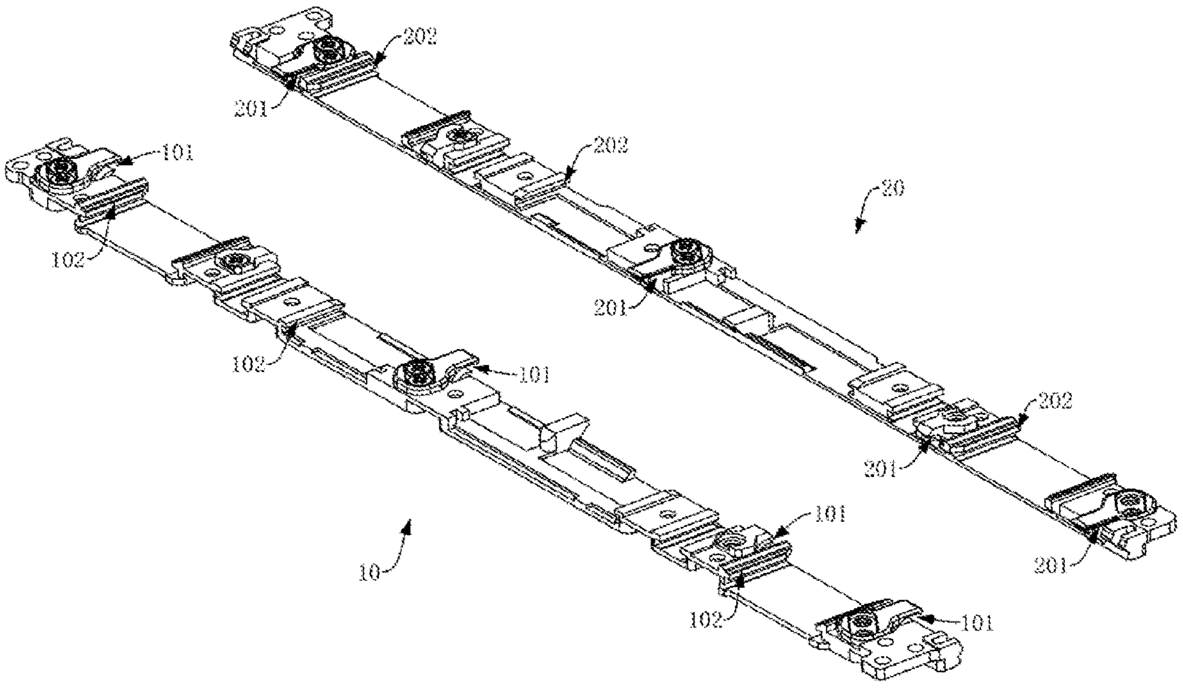
FIG. 12 is a schematic diagram of structures of a first transmission arm and a second transmission arm in the rotating mechanism shown in FIG. 5.

FIG. 12 is a schematic diagram of structures of the first transmission arm 10 and the second transmission arm 20.

Figure 13:
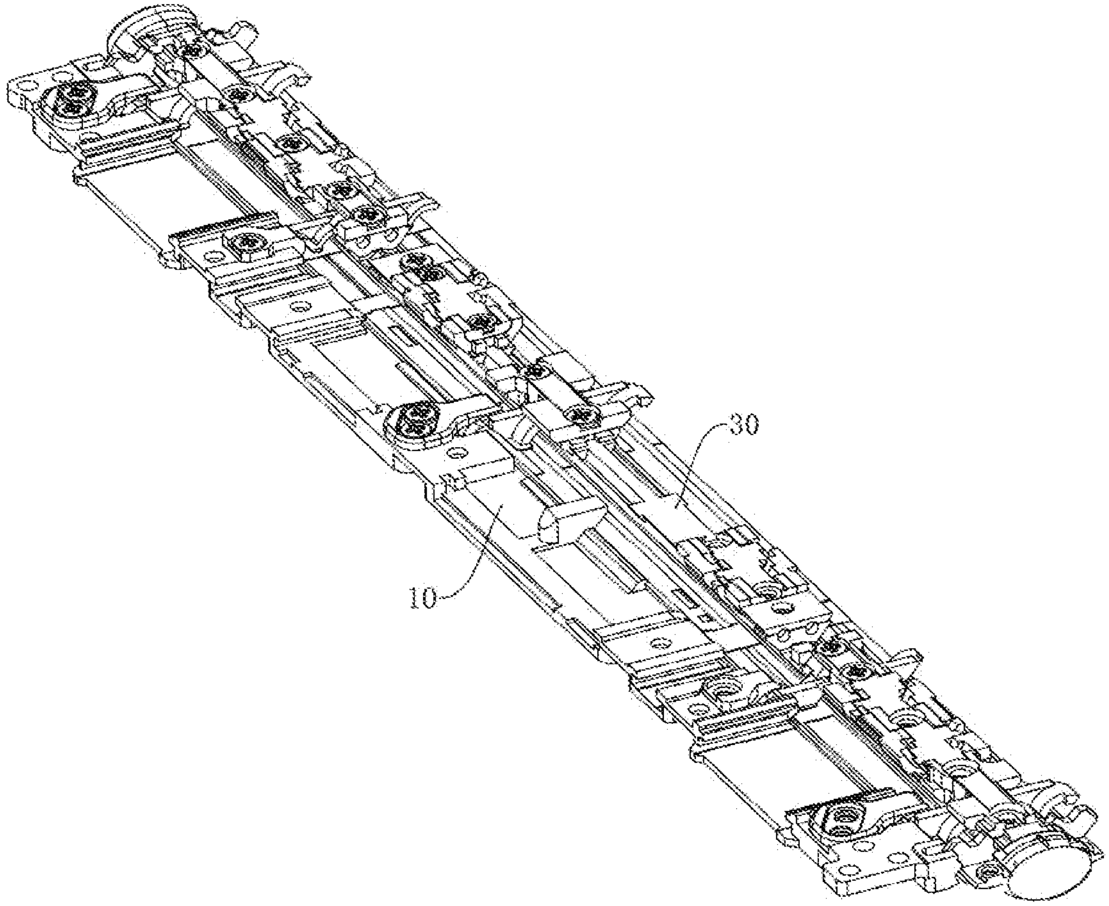
FIG. 13 is a schematic diagram of fitting between the first transmission arm shown in FIG. 12 and a main shaft assembly.
Figure 14:
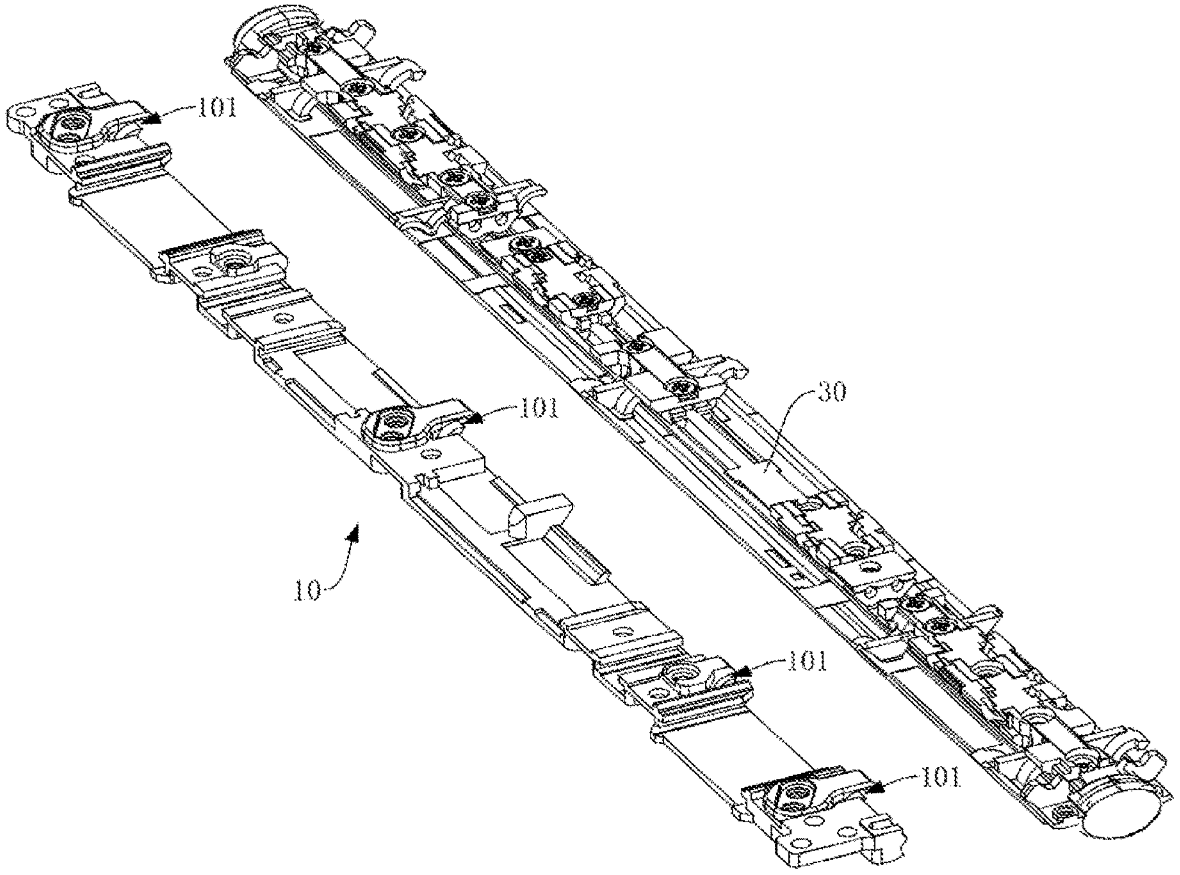
FIG. 14 is a schematic exploded view of fitting between the first transmission arm and the main shaft assembly shown in FIG. 13.

A plurality of first rotating portions 101 and a plurality of first sliding portions 102 are disposed on the first transmission arm 10. The plurality of first rotating portions 101 are disposed in a length direction of the first transmission arm 10, that is, the plurality of first rotating portions 101 are disposed at intervals in the length direction of the main shaft assembly 30. Each first rotating portion 101 is rotatably connected to the main shaft assembly 30 (refer to schematic diagrams in FIG. 13 and FIG. 14). It may be understood that the plurality of first rotating portions 101 that are disposed at intervals in the length direction of the first transmission arm 10 may form a plurality of fulcrums with the main shaft assembly 30, to maintain motion stability of the first transmission arm 10 in a process in which the first transmission arm 10 rotates relative to the main shaft assembly 30. In addition, a rotation center formed between each first rotating portion 101 and the main shaft assembly 30 is different from a rotation center formed between the first rotating end 401 of the first rotating arm 40 and the main shaft assembly 30. Because the bend radius of the first transmission arm 10 is different from the bend radius of the first rotating arm 40, rotation centers of the first transmission arm 10 and the first rotating arm 40 also need to be set differently, to achieve an effect that the first transmission arm 10 and the first rotating arm 40 rotate synchronously.

Figure 15:
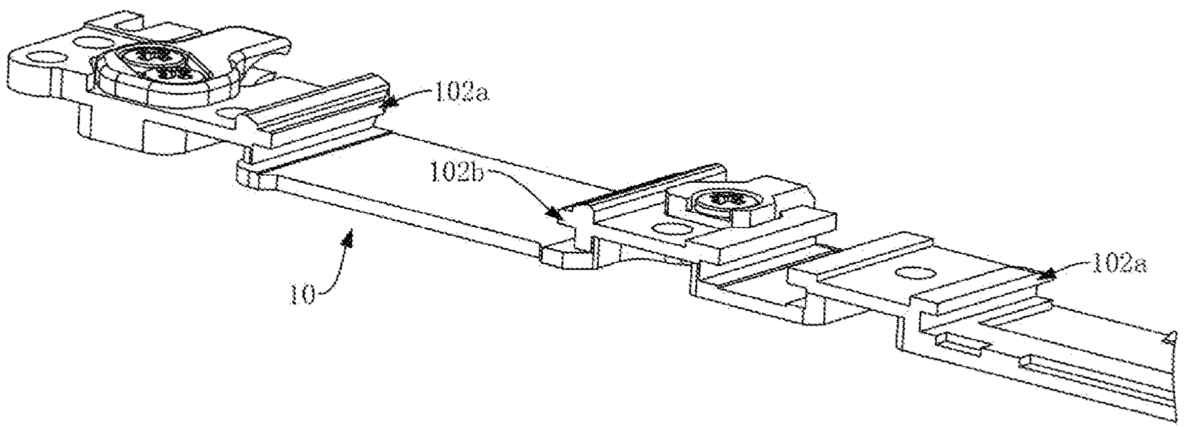
FIG. 15 is a schematic diagram of a partial structure of a first sliding portion of the first transmission arm shown in FIG. 12.

The plurality of first sliding portions 102 of the first transmission arm 10 are also disposed at intervals in the length direction of the first transmission arm 10, that is, the plurality of first sliding portions 102 are disposed at intervals in the length direction of the main shaft assembly 30. For details, refer to FIG. 15. Each first sliding portion 102 may be constructed as two first slide rails 102*a* and 102*b* that are opposite to each other, and each first sliding portion 102 is disposed corresponding to a position of the first rotating member 41 or the second rotating member 42 of the first rotating arm 40.

Figure 16:
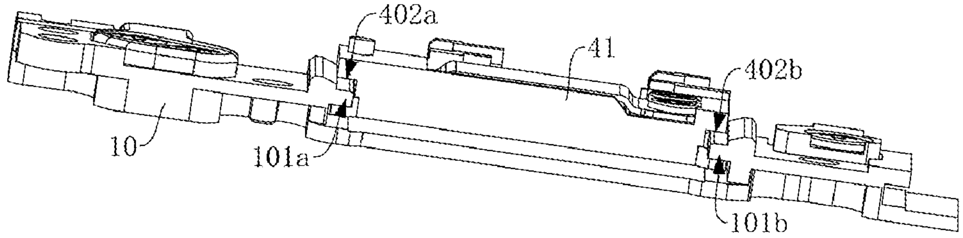
FIG. 16 is a schematic diagram of fitting between the first sliding portion shown in FIG. 12 and a first rotating member.
Figure 17:
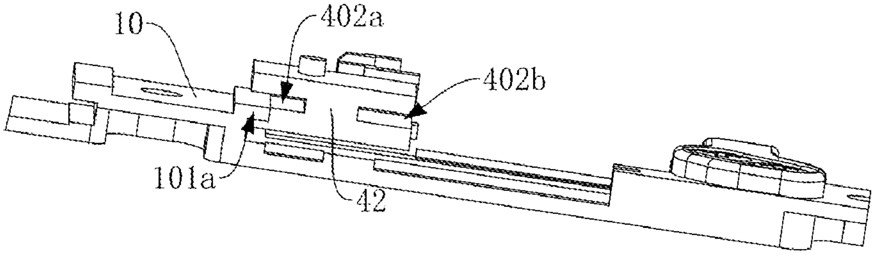
FIG. 17 is a schematic diagram of fitting between the first sliding portion shown in FIG. 12 and a second rotating member.

Refer to FIG. 16. The first sliding end 402 disposed on the first rotating member 41 is constructed as two first sliding slots 402*a* and 402*b* that are back to each other. One first sliding slot 402*a* is sleeved on one first slide rail 102*a*, and the other first sliding slot 402*b* is sleeved on one first slide rail 102*b*. In this way, the first sliding slots 402*a* and 402*b* may slide relative to the first slide rails 102*a* and 102*b* respectively, so that the first sliding end 402 on the first rotating member 41 may slide relative to one first sliding portion 102. However, on the second rotating member 42 shown in FIG. 17, the first sliding end 402 of the second rotating member 42 is constructed as a single first sliding slot 402*a*. One first sliding slot 402*a* is sleeved on the first slide rail 102*a* of the other first sliding portion 102, and the other first sliding slot 402*b* is idle. Therefore, the first sliding end 402 on the second rotating member 42 may also slide relative to one first sliding portion 102. It may be understood that the idle first sliding slot 402*b* may also be sleeved on one first slide rail 102*b*.

Through the foregoing disposition, the first rotating arm 40 and the first transmission arm 10 are slidably connected. In addition, sliding connections between a plurality of first sliding ends 402 and the plurality of first sliding portions 102 may ensure that the first rotating arm 40 smoothly slides relative to the first transmission arm 10. It may be understood that the first sliding end 402 may alternatively be constructed as a slide rail structure, and correspondingly, the first sliding portion 102 is constructed as a sliding slot structure. Alternatively, in some embodiments, the first sliding end 402 is of a structure that includes both the slide rail and the sliding slot, and correspondingly, the first sliding portion 102 is of a structure that includes both the sliding slot and the slide rail. Through fitting of the slide rails and sliding slots between the first sliding end 402 and the first sliding portion 102, the first rotating arm 40 and the first transmission arm 10 are slidably connected.

Figure 18:
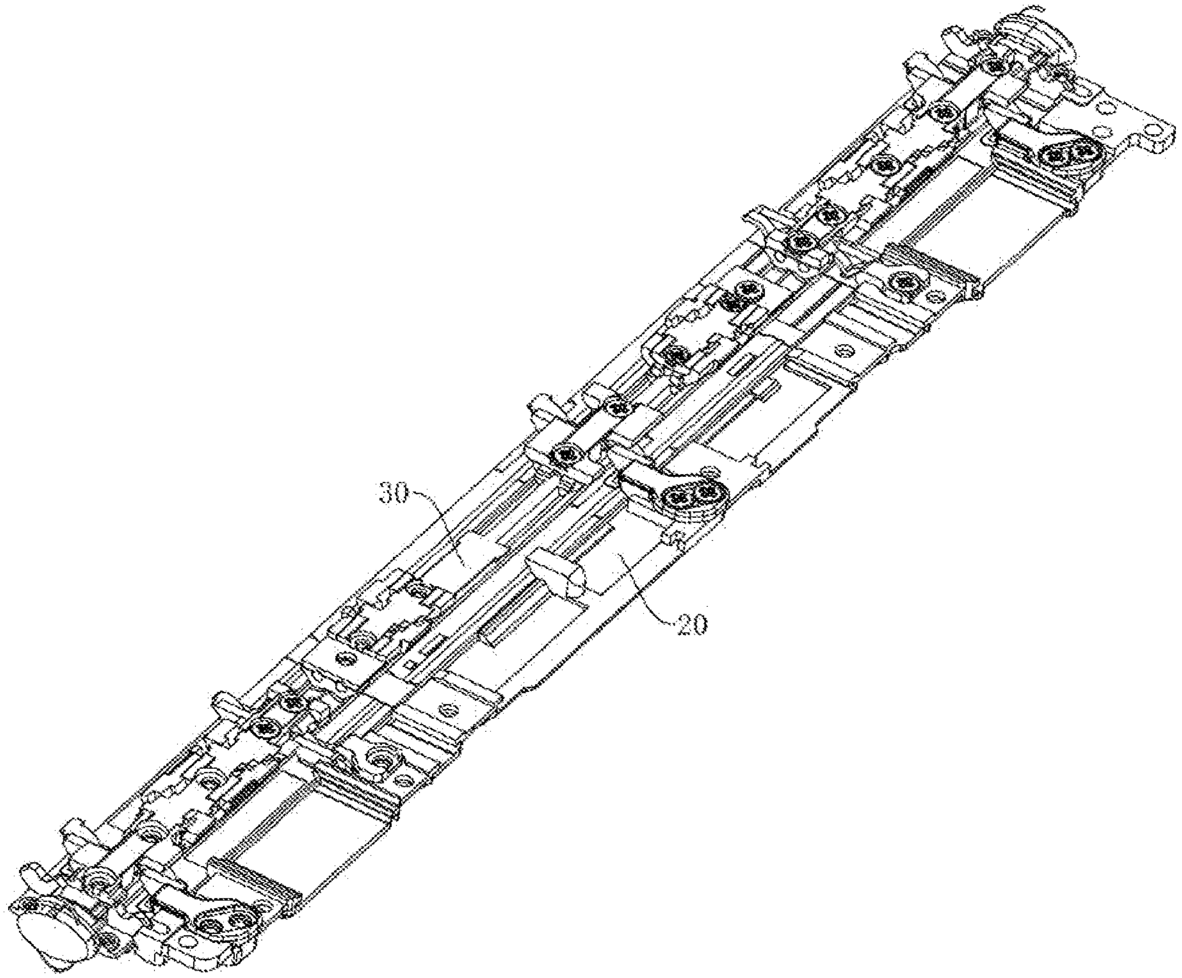
FIG. 18 is a schematic diagram of fitting between the second transmission arm shown in FIG. 12 and a main shaft assembly.
Figure 19:
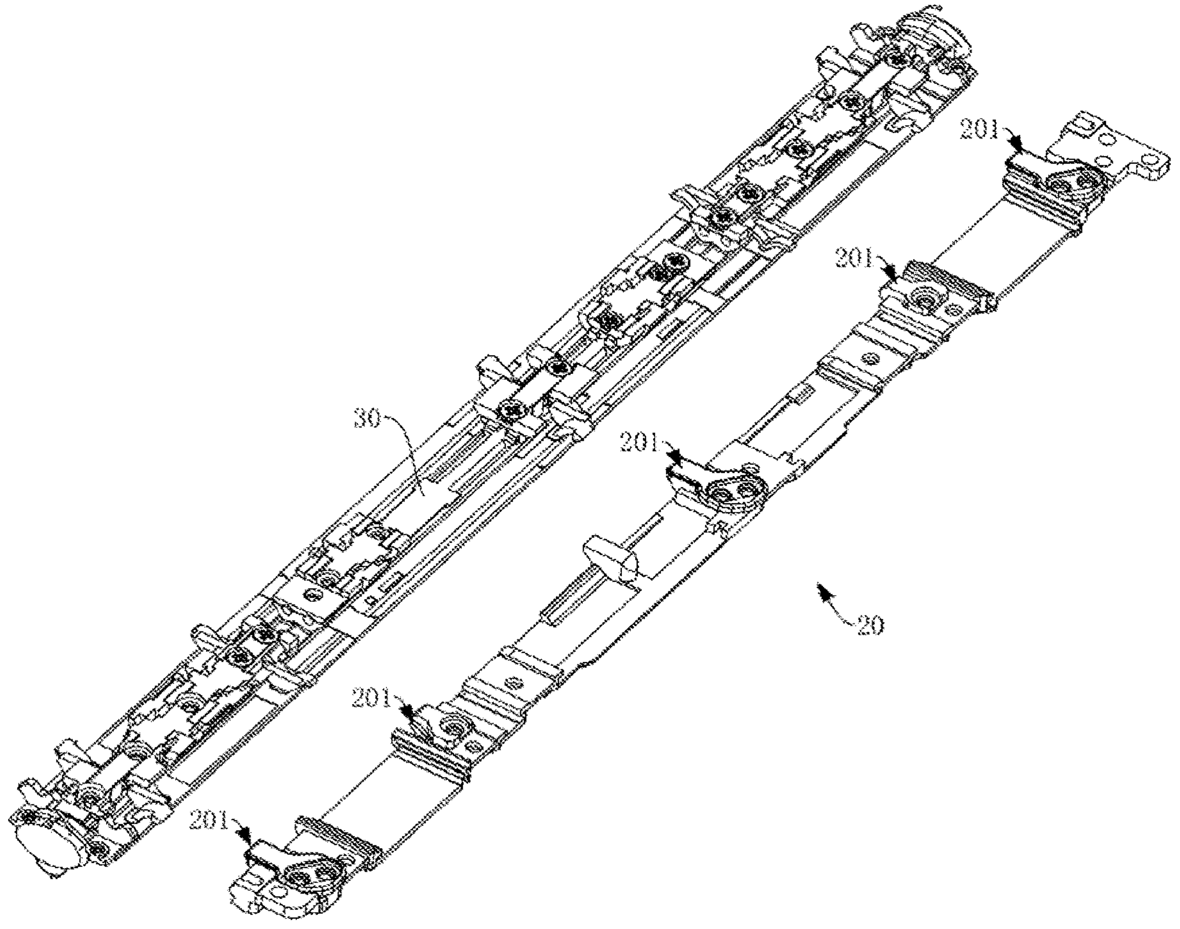
FIG. 19 is a schematic exploded view of fitting between the second transmission arm and the main shaft assembly shown in FIG. 18.

Refer to FIG. 12 again. A plurality of second rotating portions 201 and a plurality of second sliding portions 202 are disposed on the second transmission arm 20. The plurality of second rotating portions 201 are disposed in a length direction of the second transmission arm 20, that is, the plurality of second rotating portions 201 are disposed at intervals in the length direction of the main shaft assembly 30. Each second rotating portion 201 is rotatably connected to the main shaft assembly 30 (refer to schematic diagrams in FIG. 18 and FIG. 19). The plurality of second rotating portions 201 disposed at intervals in the length direction of the second transmission arm 20 may also form a plurality of fulcrums with the main shaft assembly 30, to maintain motion stability of the second transmission arm 20 in a process in which the second transmission arm 20 rotates relative to the main shaft assembly 30. In addition, a rotation center formed between each second rotating portion 201 and the main shaft assembly 30 is also different from a rotation center formed between the second rotating end 501 of the second rotating arm 50 and the main shaft assembly 30, so that the second transmission arm 20 and the second rotating arm 50 rotate synchronously.

Figure 20:
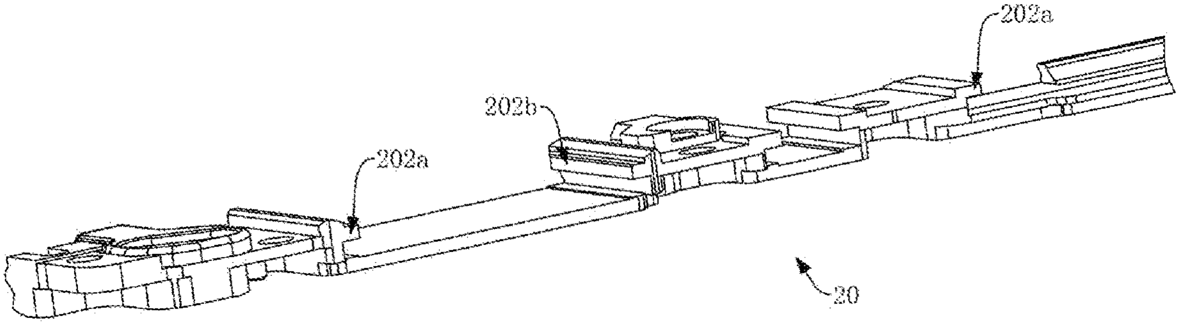
FIG. 20 is a schematic diagram of a partial structure of a second sliding portion of the second transmission arm shown in FIG. 12.

The plurality of second sliding portions 202 of the second transmission arm 20 are also disposed at intervals in the length direction of the second transmission arm 20, that is, the plurality of second sliding portions 202 are disposed at intervals in the length direction of the main shaft assembly 30. For details, refer to FIG. 20. Each second sliding portion 202 may be constructed as two second slide rails 202*a* and 202*b* that are opposite to each other, and each second sliding portion 202 is disposed corresponding to a position of the third rotating member 51 or the fourth rotating member 52 of the second rotating arm 50.

Figure 21:
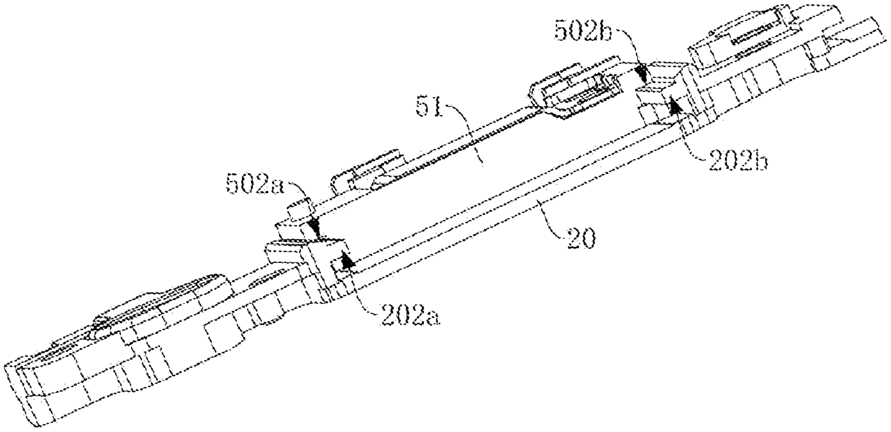
FIG. 21 is a schematic diagram of fitting between the second sliding portion shown in FIG. 12 and a third rotating member.
Figure 22:
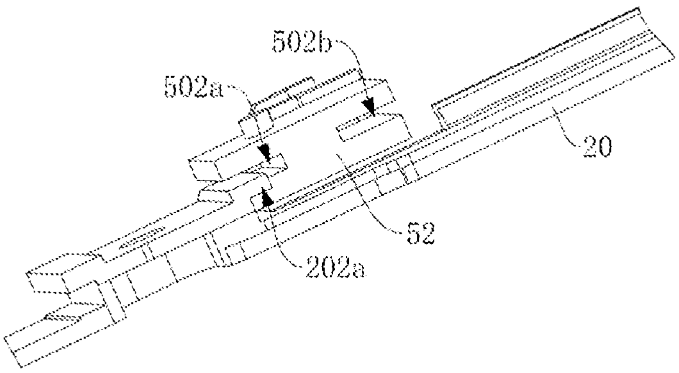
FIG. 22 is a schematic diagram of fitting between the second sliding portion shown in FIG. 12 and a fourth rotating member.

Refer to FIG. 21. The second sliding end 502 disposed on the third rotating member 51 is constructed as two second sliding slots 502*a* and 502*b* that are back to each other. One second sliding slot 502*a* is sleeved on one second slide rail 202*a*, and the other second sliding slot 502*b* is sleeved on one second slide rail 202*b*. In this way, the second sliding slots 502*a* and 502*b* may slide relative to the second slide rails 202*a* and 202*b* respectively, so that the second sliding end 502 on the third rotating member 51 may slide relative to one second sliding portion 202. On the fourth rotating member 52 shown in FIG. 22, the second sliding end 502 of the fourth rotating member 52 is also constructed as two second sliding slots 502*a* and 502*b* that are back to each other. One second sliding slot 502*a* is sleeved on the second slide rail 202*a* of the other second sliding portion 202, and the other second sliding slot 502*b* is also idle. Therefore, the second sliding end 502 on the fourth rotating member 52 may also slide relative to one second sliding portion 202. It may be understood that the idle second sliding slot 502*b* may also be sleeved on one second slide rail 202*b*.

Through the foregoing disposition, the second rotating arm 50 and the second transmission arm 20 are slidably connected. In addition, sliding connections between a plurality of second sliding ends 502 and the plurality of second sliding portions 202 may ensure that the second rotating arm 50 smoothly slides relative to the second transmission arm 20. It may be understood that the second sliding end 502 may also be constructed as a slide rail structure, and correspondingly, the second sliding portion 202 is constructed as a sliding slot structure. Alternatively, in some embodiments, the second sliding end 502 is of a structure that includes both the slide rail and the sliding slot, and correspondingly, the second sliding portion 202 is of a structure that includes both the sliding slot and the slide rail. Through fitting of the slide rails and sliding slots between the second sliding end 502 and the second sliding portion 202, the second rotating arm 50 and the second transmission arm 20 are slidably connected.

Figure 23:
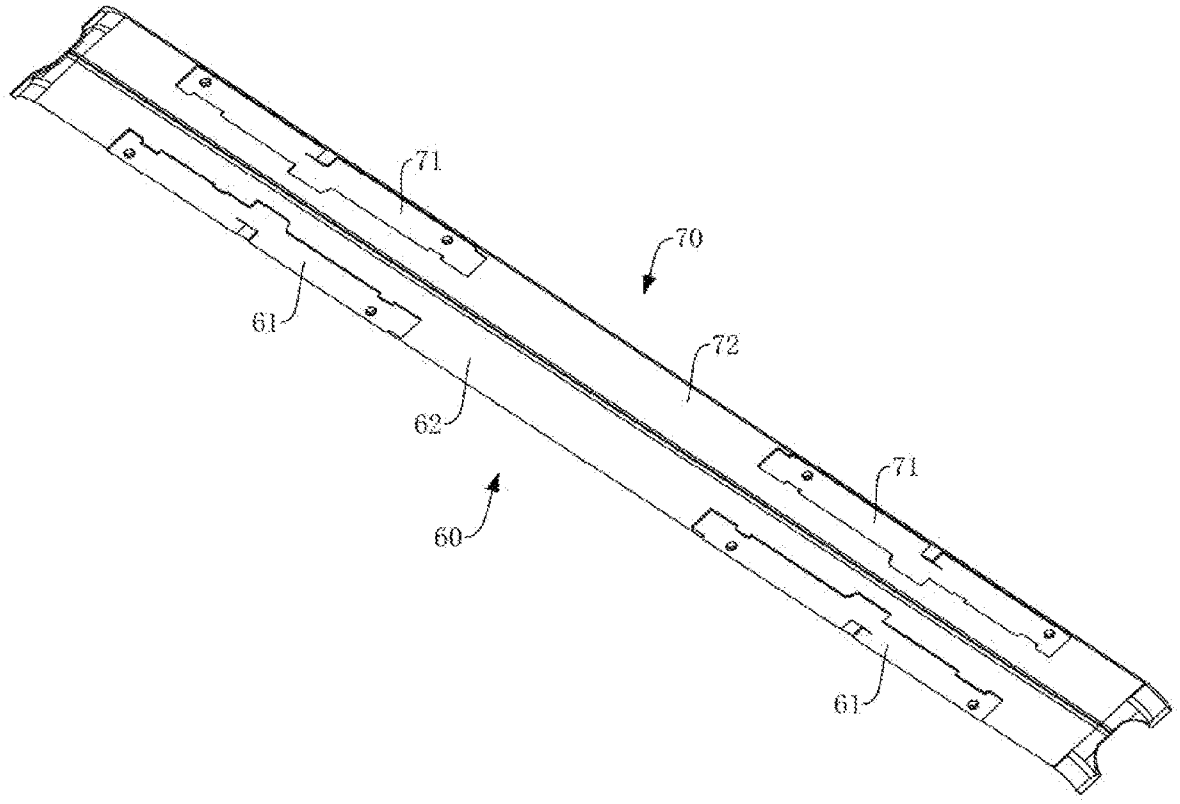
FIG. 23 is a schematic diagram of structures of a first shielding member and a second shielding member in the rotating mechanism shown in FIG. 5.

Refer to a schematic diagram of structures of the first shielding member 60 and the second shielding member 70 in FIG. 23.

In this application, the first shielding member 60 is fastened to the first sliding end 402 of the first rotating arm 40, and the second shielding member 70 is fastened to the second sliding end 502 of the second rotating arm 50. The first shielding member 60 includes a first fastener 61 and a first cover plate 62. The first fastener 61 is configured to be fastened to the first sliding end 402. Specifically, there are a plurality of first fasteners 61, and the plurality of first fasteners 61 are configured to be fastened to one first rotating member 41 and/or one second rotating member 42, and are located on one side that is of the first rotating member 41 and/or the second rotating member 42 and that is close to the first sliding end 402, so that positions of each first fastener 61 and the first sliding end 402 are fixed.

Figure 24:
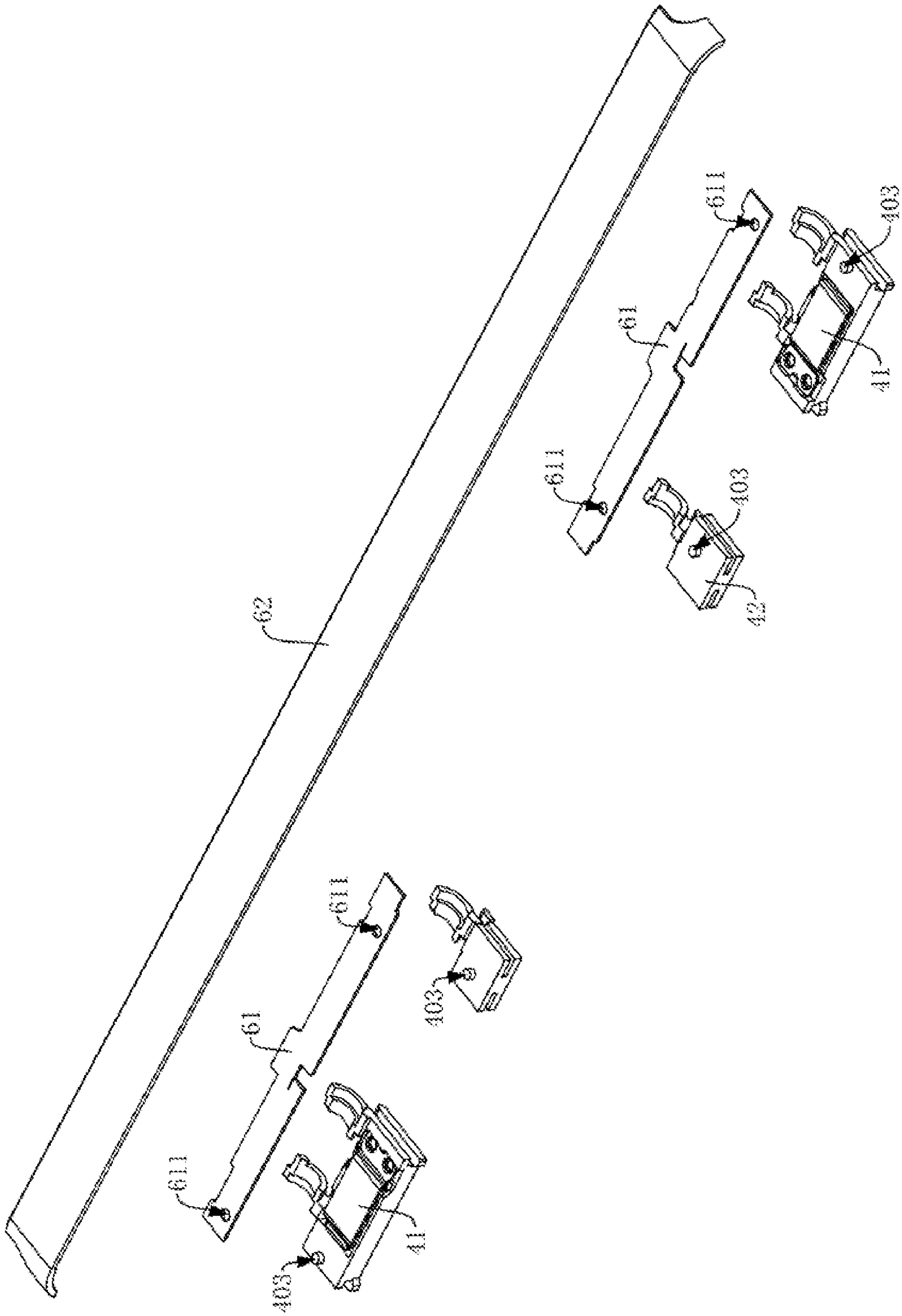
FIG. 24 is a schematic diagram of fitting between the first shielding member shown in FIG. 23 and a first rotating arm.
Figure 25:
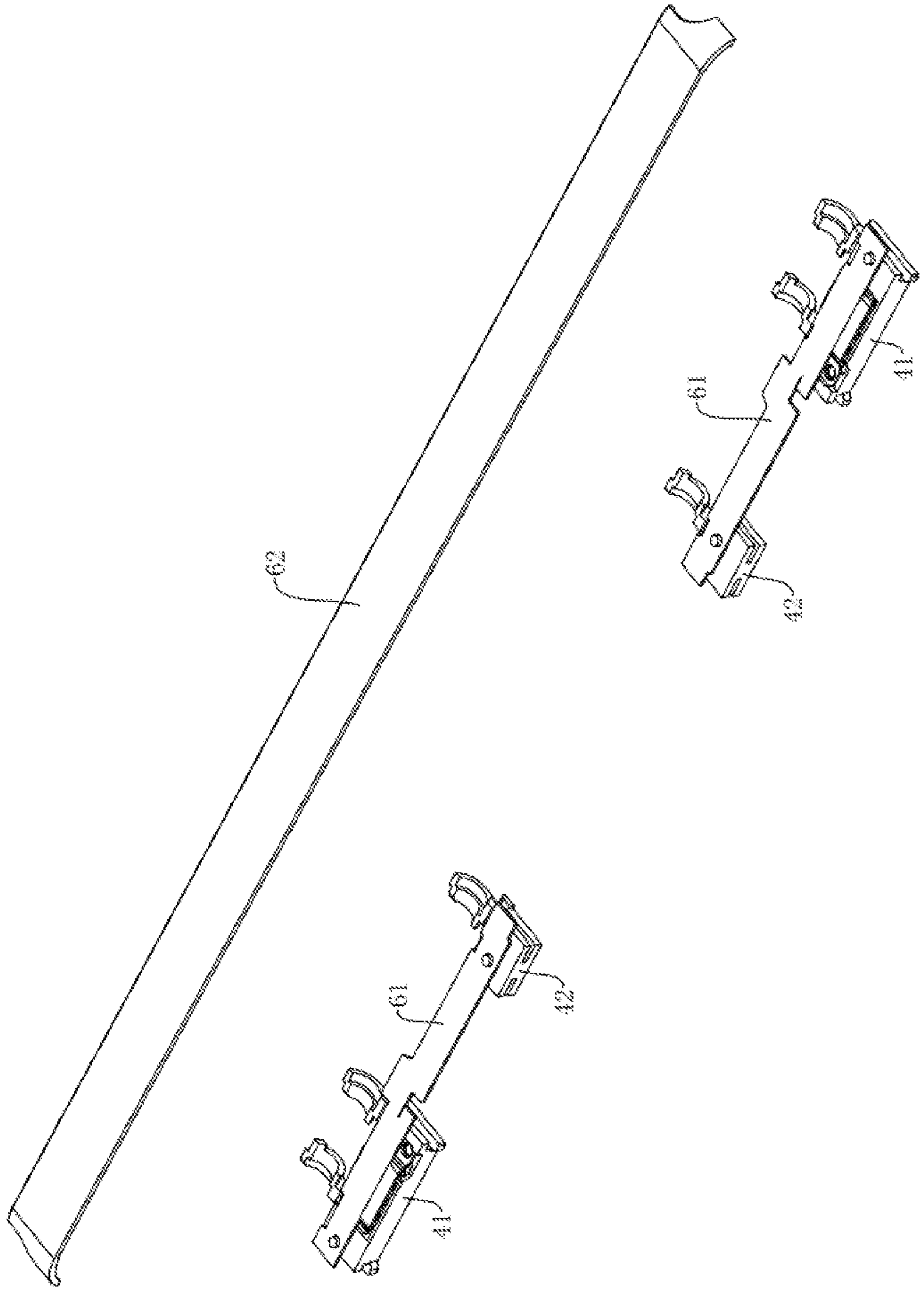
FIG. 25 is a schematic exploded view of fitting between the first shielding member and the first rotating arm shown in FIG. 24.

Refer to FIG. 24 and FIG. 25. In this embodiment, a plurality of first positioning holes 611 are disposed on the first fastener 61, and correspondingly a plurality of first positioning rods 403 are disposed on the first rotating arm 40. The first positioning rod 403 is also distributed on each first rotating member 41 and each second rotating member 42. Each first positioning rod 403 is disposed corresponding to a position of one first positioning hole 611, so that the first fastener 61 can be sleeved and fastened on the first rotating arm 40. Because each first rotating member 41 and each second rotating member 42 are disposed in the length direction of the main shaft assembly 30, each first positioning rod 403 is also disposed in the length direction of the main shaft assembly 30, and the first fastener 61 can form a plurality of fitting fixed support points with the first rotating arm 40) in the length direction of the main shaft assembly 30. When the first rotating arm 40 rotates relative to the main shaft assembly 30, the first fastener 61 rotates synchronously with the first rotating arm 40, and a rotation action of the first fastener 61 relative to the main shaft assembly 30 is also relatively stable.

In addition, in the embodiment shown in the figure, there are two first fasteners 61, the two first fasteners 61 are disposed at an interval in the length direction of the main shaft assembly 30, and the first positioning holes 611 are distributed on the two first fasteners 61. Compared with an embodiment in which a plurality of first positioning holes 611 are disposed on a structure of a single relatively long first fastener 61, a structure of disposing a plurality of first fasteners 61 helps ensure position precision of the first positioning hole 611 on each first fastener 61, reduce a machining precision requirement of each first fastener 61, control costs of the first fastener 61, and ensure position precision of each first fastener 61 assembled on the first rotating arm 40. It may be understood that in some other embodiments, there may alternatively be more than two first fasteners 61, and the first fasteners 61 may be specifically set based on an overall length and a structure requirement of the folding apparatus 100.

Refer to FIG. 23 again. The first cover plate 62 is in the shape of a long strip, and a length direction of the first cover plate 62 is in the length direction of the main shaft assembly 30. The first cover plate 62 is fixedly connected to each first fastener 61, and is located on a side that is of each first fastener 61 and that is away from the first rotating arm 40. That is, the first cover plate 62 is located on a side that is close to the inner side surface B of the folding apparatus 100. The first cover plate 62 is exposed on the folding apparatus 100, and is a portion of the inner side surface B of the folding apparatus. The first cover plate 62 is configured to shield internal parts of the rotating mechanism 130, to prevent external water vapor or impurities from entering the rotating mechanism 130, which causes motion freezing of the folding apparatus 100.

On the other side of the main shaft assembly 30, the second shielding member 70) includes a second fastener 71 and a second cover plate 72. The second fastener 71 is configured to be fastened to the second sliding end 502. Specifically, there are a plurality of second fasteners 71, and the plurality of second fasteners 71 are configured to be fastened to one third rotating member 51 and/or one fourth rotating member 52, and are located on one side that is of the third rotating member 51 and/or the fourth rotating member 52 and that is close to the second sliding end 502, so that positions of each second fastener 71 and the second sliding end 502 are fixed.

Figure 26:
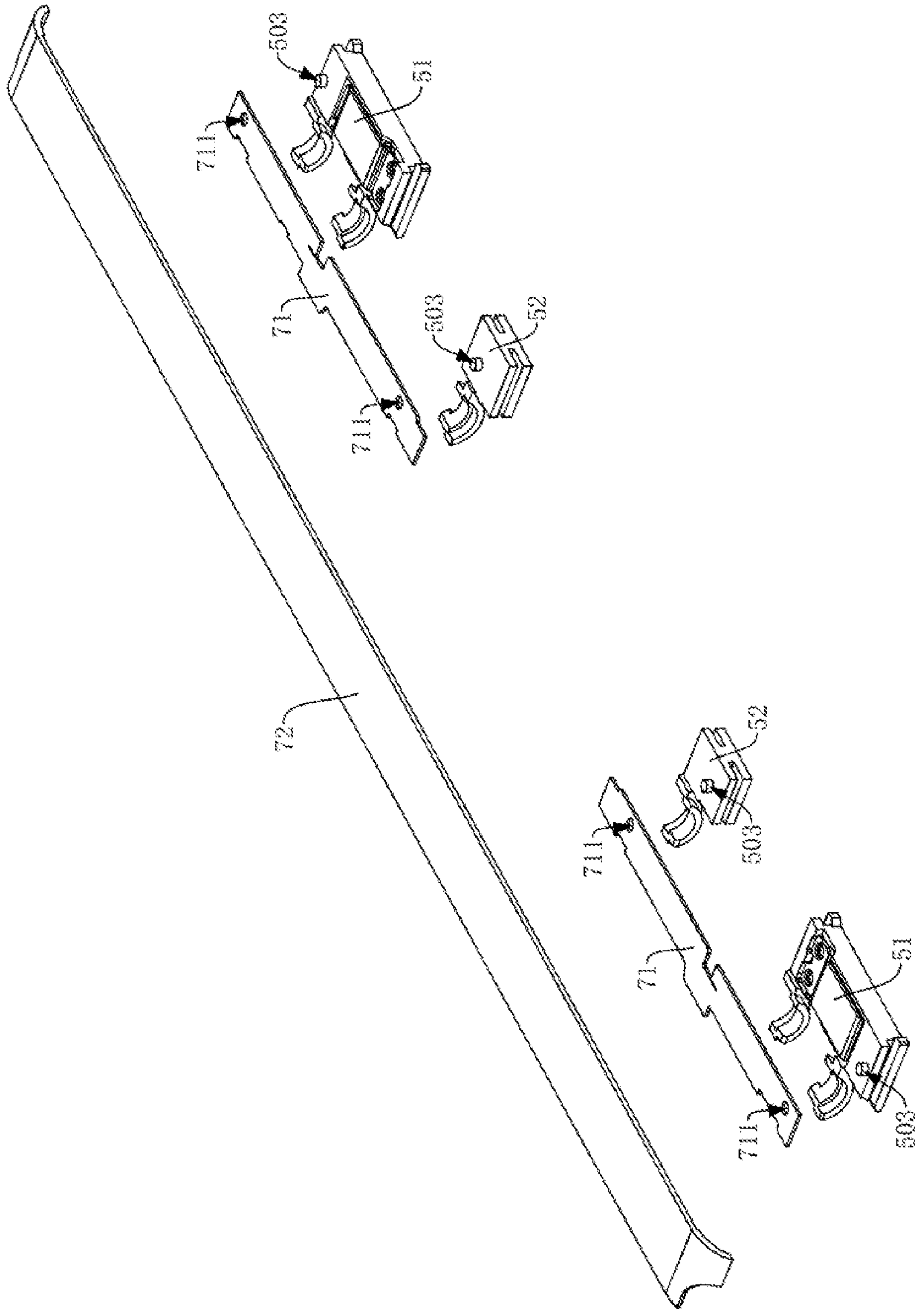
FIG. 26 is a schematic diagram of fitting between the second shielding member shown in FIG. 23 and a second rotating arm.
Figure 27:
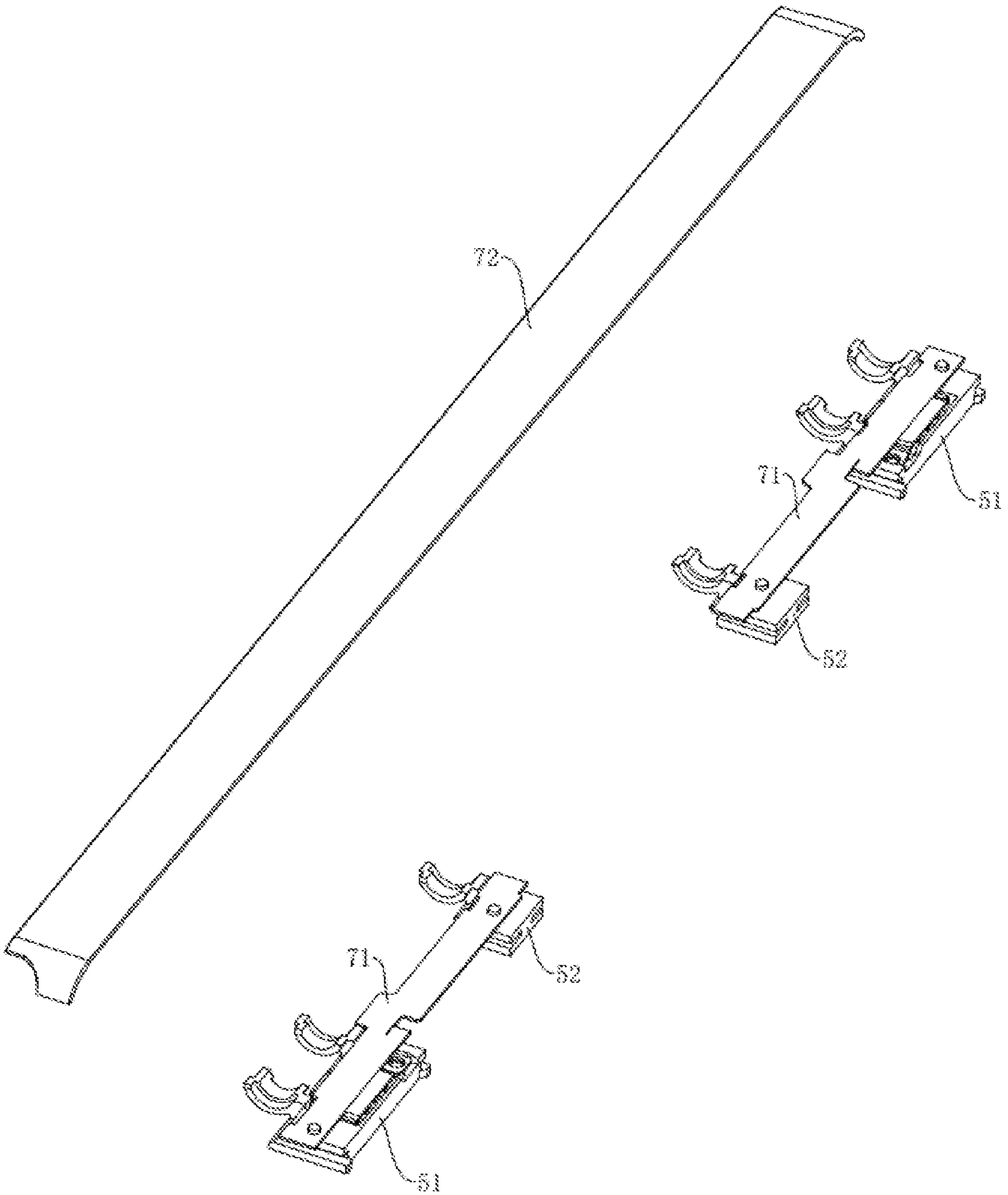
FIG. 27 is a schematic exploded view of fitting between the second shielding member and the second rotating arm shown in FIG. 26.

Refer to FIG. 26 and FIG. 27. A plurality of second positioning holes 711 are disposed on the second fastener 71, and correspondingly a plurality of second positioning rods 503 are disposed on the second rotating arm 50. The second positioning rod 503 is distributed on each third rotating member 51 and each fourth rotating member 52. Each second positioning rod 503 is disposed corresponding to a position of one second positioning hole 711, so that the second fastener 71 can be sleeved and fastened on the second rotating arm 50. The second positioning rods 503 are also disposed in the length direction of the main shaft assembly 30, and form a plurality of fitting fixed support points with the second rotating arm 50. When the second rotating arm 50) rotates relative to the main shaft assembly 30, the second fastener 71 also rotates synchronously with the second rotating arm 50, and a rotation action relative to the main shaft assembly 30 is also relatively stable.

In addition, in the embodiment shown in the figure, there are also two second fasteners 71, the two second fasteners 71 are disposed at an interval in the length direction of the main shaft assembly 30, and the second positioning holes 711 are distributed on the two second fasteners 71. A structure of disposing a plurality of second fasteners 71 also helps ensure position precision of the second positioning hole 711 on each second fastener 71, reduce machining precision of each second fastener 71, control costs, and further ensure position precision of each second fastener 71 assembled on the second rotating arm 50. It may be understood that, in some other embodiments, there may alternatively be more than two second fasteners 71.

The second cover plate 72 is also in the shape of a long strip, and a length direction of the second cover plate 72 is in the length direction of the main shaft assembly 30. The second cover plate 72 is fixedly connected to each second fastener 71, and is located on a side that is of each second fastener 71 and that is away from the second rotating arm 50. The second cover plate 72 is also exposed on the folding apparatus 100, and is a portion of the inner side surface B of the folding apparatus. The second cover plate 72 may also be configured to shield the internal parts of the rotating mechanism 130, to prevent external water vapor or impurities from entering the rotating mechanism 130, which causes motion freezing of the folding apparatus 100.

Figure 28:
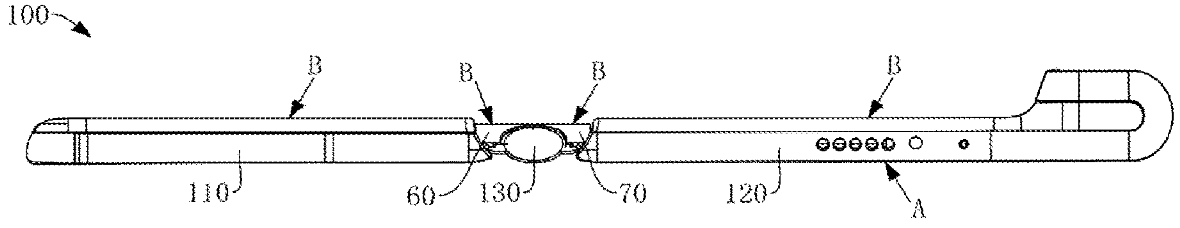
FIG. 28 is a schematic diagram of a structure of the folding apparatus shown in FIG. 2 in a side view direction.
Figure 29:
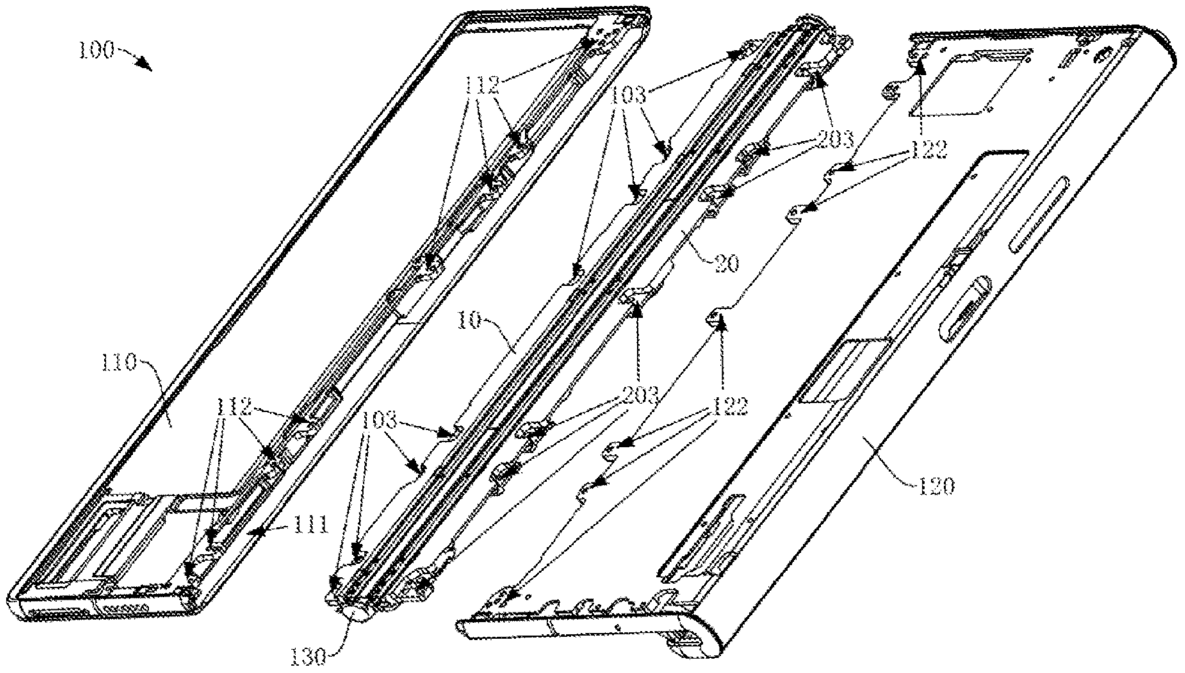
FIG. 29 is a schematic diagram of a structure of the folding apparatus shown in FIG. 4 in another observation direction.

Refer to FIG. 4 again, and refer to FIG. 28 and FIG. 29. FIG. 28 shows a structure of the folding apparatus 100 in an unfolded state. On the side of the inner side surface B of the folding apparatus 100 in this application, a height of the rotating mechanism 130 is lower than a height of the first housing 110 and a height of the second housing 120. In addition, the first shielding member 60 and the second shielding member 70 are located on an outermost side of the rotating mechanism 130 facing the inner side surface B, that is, the first shielding member 60) and the second shielding member 70) are constructed as an inner side surface B of the rotating mechanism 130. In this case, a height of the first shielding member 60 and a height of the second shielding member 70 are lower than the height of the first housing 110 and the height of the second housing 120, respectively. Further, a first accommodating cavity 111 is disposed on a side that is of the first housing 110 and that is close to the rotating mechanism 130, and a second accommodating cavity 121 is disposed on a side that is of the second housing 120 and that is close to the rotating mechanism 130. The first accommodating cavity 111 is configured to accommodate the first shielding member 60, and the second accommodating cavity 121 is configured to accommodate the second shielding member 70.

Figure 30:
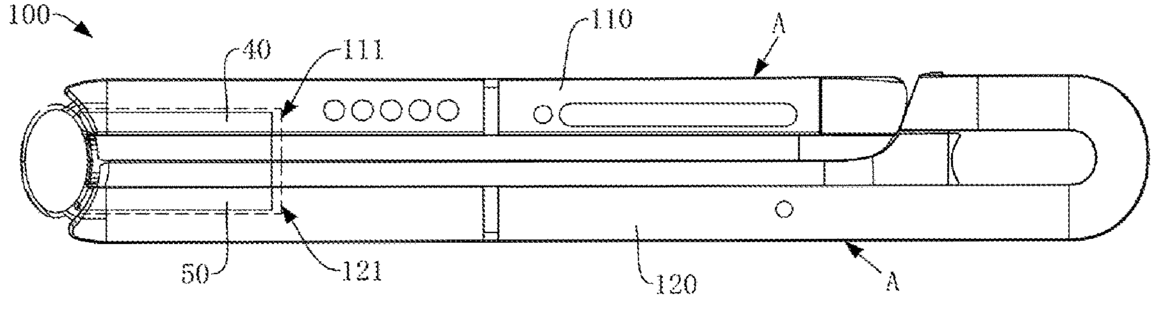
FIG. 30 is a schematic diagram of a partial structure of the folding apparatus shown in FIG. 3 in a folded state.

For details, refer to FIG. 30. When the folding apparatus 100 switches from the unfolded state to the folded state, the first rotating arm 40 and the second rotating arm 50) respectively slide relative to the first transmission arm 10 and the second transmission arm 20. In addition, the first rotating arm 40 slides towards the first housing 110, and the second rotating arm 50 slides towards the second housing 120. In this way, the first shielding member 60 and the second shielding member 70 that are fixedly connected to the first rotating arm 40 and the second rotating arm 50 respectively slide with the first rotating arm 40 and the second rotating arm 50 respectively towards the first housing 110 and the second housing 120. Further, a portion of the first shielding member 60) is slid into the first accommodating cavity 111 of the first housing 110, and a portion of the second shielding member 70 is slid into the second accommodating cavity 121 of the second housing 120.

It may be understood that, when the folding apparatus 100 switches from the folded state to the unfolded state, it may be understood that the first shielding member 60) and the second shielding member 70 respectively slide towards the main shaft assembly 30. When the folding apparatus 100 is in the unfolded state, the first shielding member 60 and the second shielding member 70 can approach each other, to shield and protect the main shaft assembly 30, the first rotating arm 40, the second rotating arm 50, the first transmission arm 10, and the second transmission arm 20. Therefore, the first shielding member 60 and the second shielding member 70 may prevent external water vapor or dust from intruding the inside of the rotating mechanism 130, and improve an appearance effect of the folding apparatus 100.

It may be understood that appearance effects of the first shielding member 60 and the second shielding member 70 may be set for matching appearance effects of the first housing 110 and the second housing 120, so that appearance effects of the folding apparatus 100 in this application on the inner side surface B tend to be consistent. In this embodiment, the appearance effect of the folding apparatus 100 may include color, brightness, pattern, and the like. The first shielding member 60) and the second shielding member 70 use a same baking paint, film coating process, surface treatment process, and the like as the first housing 110 and the second housing 120, which improves appearance consistency on the inner side surface B. It may be understood that when shapes and materials of the first shielding member 60, the second shielding member 70, the first housing 110, and the second housing 120 are further unified, overall appearance effect consistency of the folding apparatus 100 is further ensured.

However, through mechanism disposition of the rotating mechanism 130, the first shielding member 60 and the second shielding member 70 shield the rotating mechanism 130 when the folding apparatus 100 is in the unfolded state. In an embodiment, when the folding apparatus 100 is in the unfolded state, a width of an interstice between the first shielding member 60 and the second shielding member 70 may be set to be less than or equal to 0.1 mm, to ensure a protection effect of the first shielding member 60 and the second shielding member 70 to the rotating mechanism 130. Further, in the folding apparatus 100 in this application, the first shielding member 60 is directly fastened on the first rotating arm 40, and the second shielding member 70 is directly fastened on the second rotating arm 50, so that the first shielding member 60) and the second shielding member 70) move synchronously with the first rotating arm 40 and the second rotating arm 50, respectively. Movement tracks of the first shielding member 60 and the second shielding member 70 are relatively simple, and a structure of the rotating mechanism 130 is also relatively simple. In this way, an overall volume of the rotating mechanism 130 may be compressed, and manufacturing costs of the folding apparatus 100 may be reduced.

In addition, in a shielding solution of the conventional technology, a relatively complex structure is generally used, and an internal part of the rotating mechanism 130 usually needs to be removed during maintenance and protection, which is relatively difficult. However, in the folding apparatus 100 in this application, the first shielding member 60 and the first rotating arm 40 are fitted and fastened through the first positioning hole 611 and the first positioning rod 403, and the second shielding member 70 and the second rotating arm 50 are fitted and fastened through the second positioning hole 711 and the second positioning rod 503. This facilitates rotatable assembly and disassembly of the first shielding member 60 and the second shielding member 70 on the rotating mechanism 130. It may be understood that, when the first shielding member 60, the second shielding member 70, or both in the folding apparatus 100 in this application are accidentally damaged, the first shielding member 60 and/or the second shielding member 70 may be directly removed from the side of the inner side surface B of the folding apparatus 100 and then replaced.

In some embodiments, the first fastener 61 and the first cover plate 62 in the first shielding member 60 are bonded by using glue, and the second fastener 71 and the second cover plate 72 in the second shielding member 70 are bonded by using glue. When the first cover plate 62, the second cover plate 72, or both are damaged, the first cover plate 62 and/or the second cover plate 72 may be partially heated. After glue melts, the first cover plate 62, the second cover plate 72, or both are directly removed and then replaced.

Figure 31:
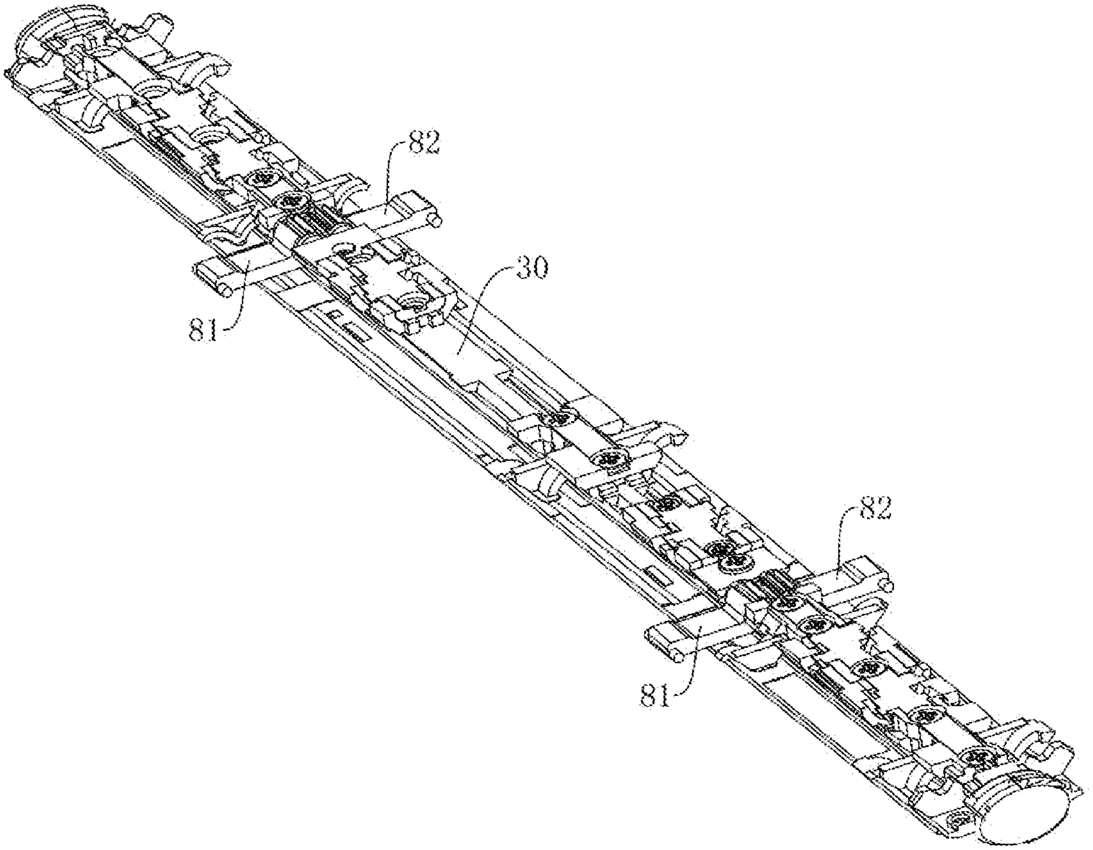
FIG. 31 is a schematic diagram of structures of a first meshing member and a second meshing member in the rotating mechanism shown in FIG. 5.
Figure 32:
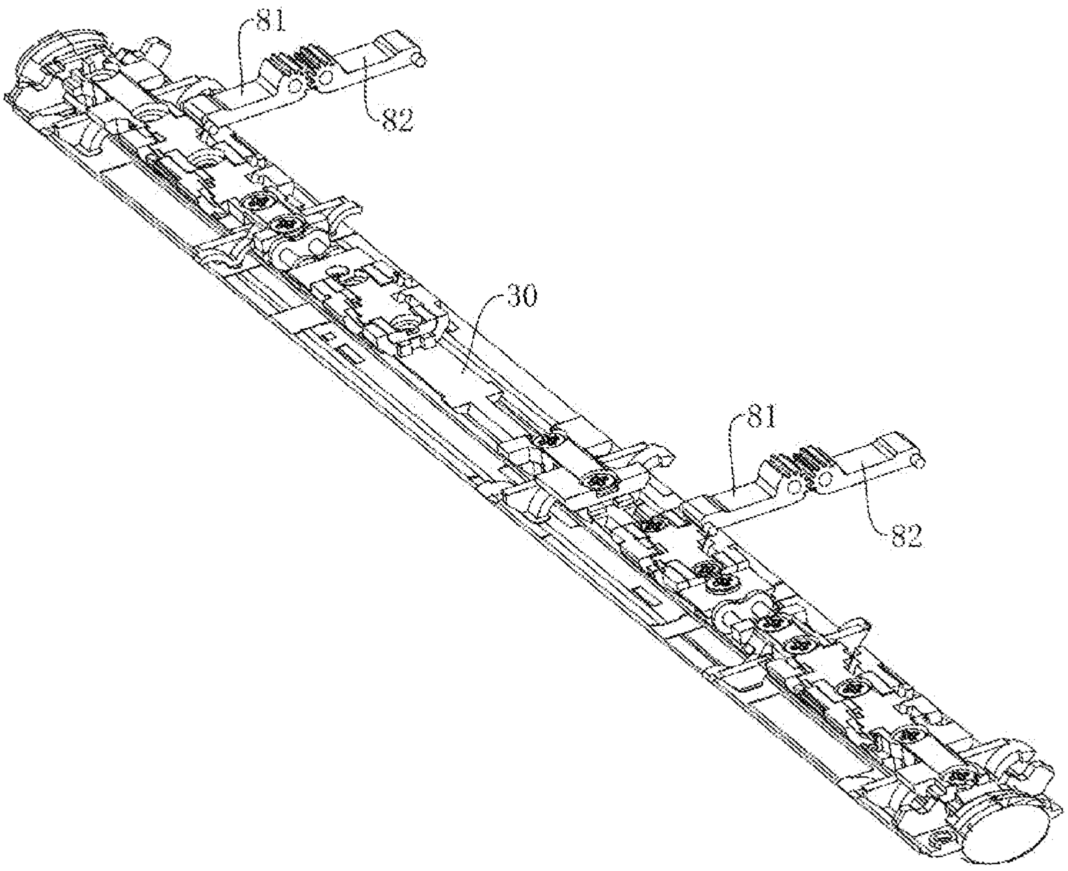
FIG. 32 is a schematic exploded view of the first meshing member and the second meshing member in the rotating mechanism shown in FIG. 31.

In an embodiment, refer to FIG. 31 and FIG. 32. The rotating mechanism 130 in this application further includes a first meshing member 81 and a second meshing member 82. In a direction from the first housing 110 to the second housing 120, the first meshing member 81 and the second meshing member 82 are symmetrically disposed relative to the center of the main shaft assembly 30, and are extended towards the first housing 110 and the second housing 120, respectively. The first meshing member 81 is located on a side close to the first housing 110, and the second meshing member 82 is located on a side close to the second housing 120.

In a direction from the outer side surface A to the inner side surface B of the folding apparatus 100, the first meshing member 81 is located between the first transmission arm 10 and the first shielding member 60, and the second meshing member 82 is located between the second transmission arm 20 and the second shielding member 70. Therefore, the first shielding member 60) and the second shielding member 70 also shield the first meshing member 81 and the second meshing member 82. Further, in the length direction of the main shaft assembly 30, there are a plurality of first meshing members 81 and a plurality of second meshing members 82, and each first meshing member 81 is disposed in pairs with one second meshing member 82.

Figure 33:
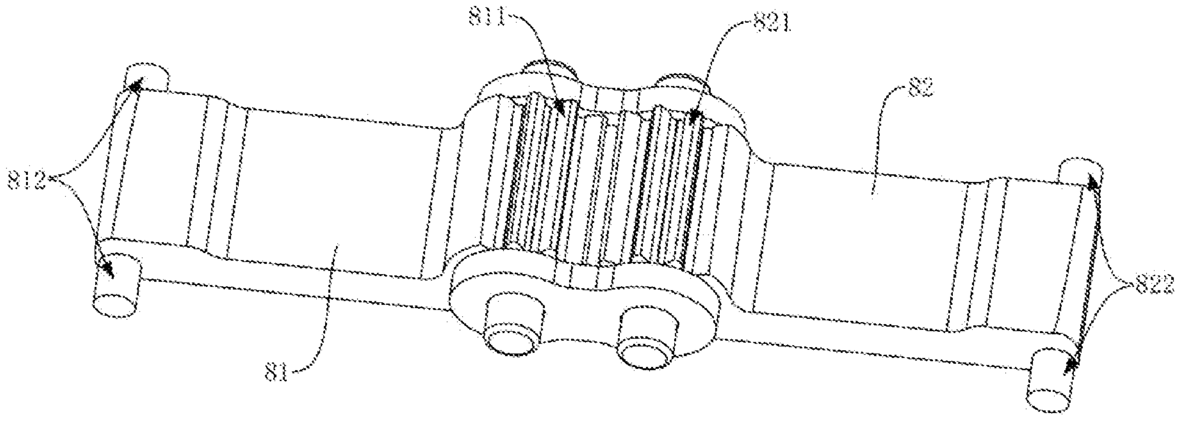
FIG. 33 is a schematic diagram of a structure for fitting between the first meshing member and the second meshing member in the rotating mechanism shown in FIG. 31.

For details, refer to FIG. 33. The first meshing member 81 includes a first meshing end 811 and a third sliding end 812 that are opposite to each other, and the second meshing member 82 includes a second meshing end 821 and a fourth sliding end 822 that are opposite to each other. In the first meshing member 81 and the second meshing member 82 that are disposed in pairs, the first meshing end 811 and the second meshing end 821 are located at positions close to each other, and the third sliding end 812 and the fourth sliding end 822 are extended towards directions opposite to each other. Meshing teeth are disposed on the first meshing end 811 and the second meshing end 821, and the first meshing end 811 and the second meshing end 821 are meshed with each other by using a structure of the meshing teeth. A rotation action of the first meshing member 81 may be transferred to the second meshing member 82 in a meshing manner, and drive the second meshing member 82 to rotate synchronously. In return, a rotation action of the second meshing member 82 may also drive the first meshing member 81 to rotate synchronously in a meshing manner.

Figure 34:
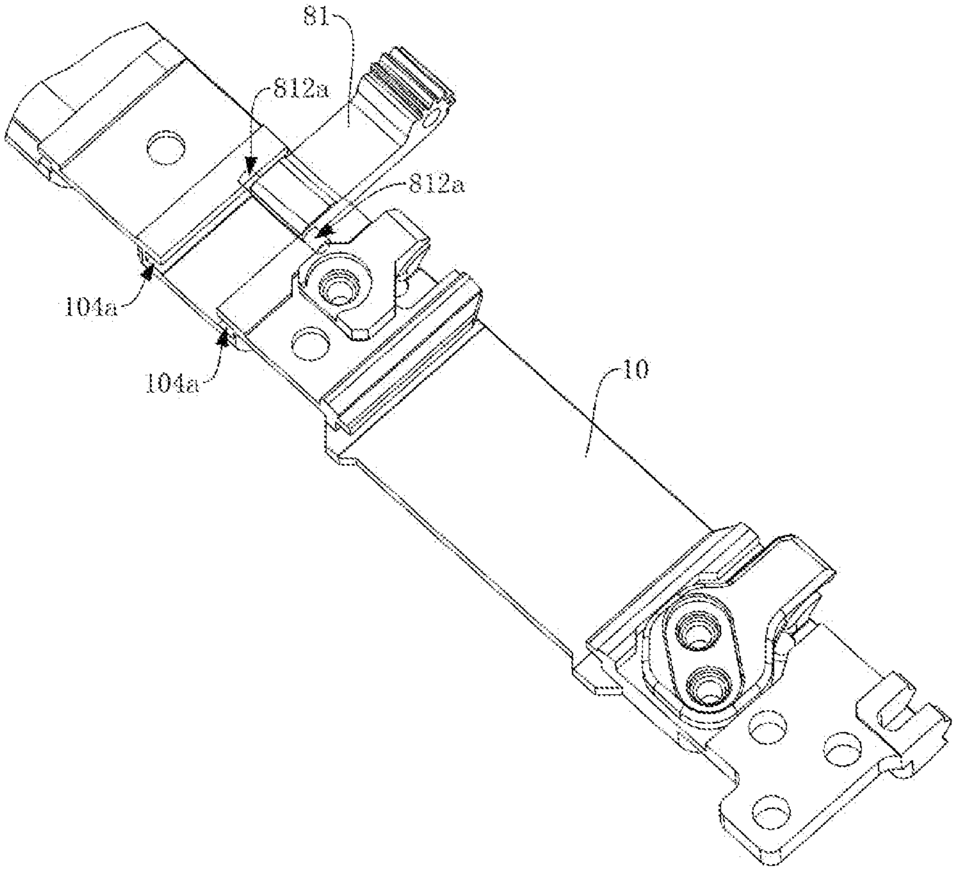
FIG. 34 is a schematic diagram of fitting between the first meshing member shown in FIG. 31 and a first transmission arm.
Figure 35:
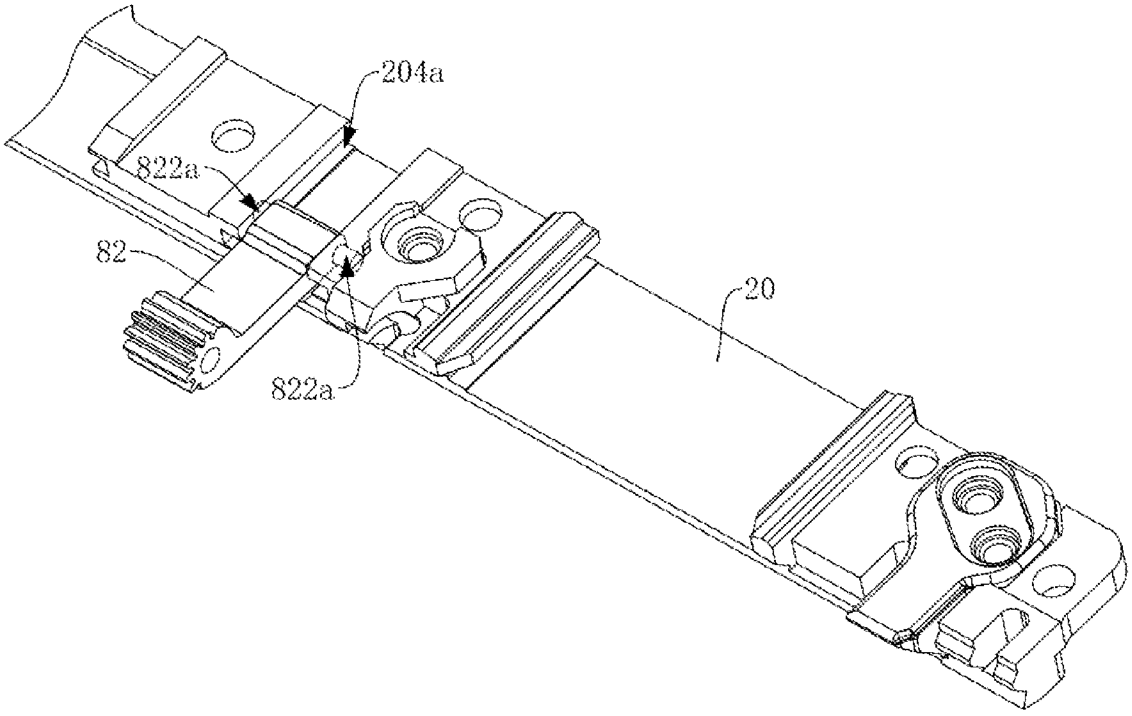
FIG. 35 is a schematic diagram of fitting between the second meshing member shown in FIG. 31 and a second transmission arm.

The third sliding end 812 of the first meshing member 81 is slidably connected to the first transmission arm 10. For details, refer to FIG. 34. In this embodiment, the third sliding end 812 is constructed as a structure of third slide rails 812*a*, and third sliding slots 104*a* are disposed at positions that are on the first transmission arm 10 and that correspond to the third sliding end 812. The third sliding slot 104*a* fits a shape of the third slide rail 812*a*, so that the third sliding end 812 can slide relative to the first transmission arm 10. Refer to FIG. 35. Correspondingly, the fourth sliding end 822 of the second meshing member 82 is slidably connected to the second transmission arm 20. The fourth sliding end 822 is constructed as a structure of fourth slide rails 822*a*, and fourth sliding slots 204*a* are disposed at positions that are on the second transmission arm 20 and that correspond to the fourth sliding end 822. The fourth sliding slot 204*a* fits a shape of the fourth slide rail 822*a*, so that the fourth sliding end 822 can slide relative to the second transmission arm 20.

Therefore, in a process of folding or unfolding the folding apparatus 100 in this application, when a user drives either the first housing 110 or the second housing 120 to rotate, the first housing 110 and the second housing 120 may rotate synchronously through fitting between the first meshing member 81 and the second meshing member 82, thereby reducing a rotation stroke of manually flipping the folding apparatus 100 in this application by the user. It may be understood that when the unfolded state of the folding apparatus 100 is 180 degrees, the user only needs to rotate the first housing 110 or the second housing 120 by 90 degrees, to complete an action of switching the folding apparatus 100 from the folded state to the unfolded state, thereby improving user experience. In addition, the first meshing member 81 and the second meshing member 82 are slidably connected to the first transmission arm 10 and the second transmission arm 20, respectively, which also ensures that the first meshing member 81 and the second meshing member 82 rotate stably inside the rotating mechanism 130.

Figure 36:
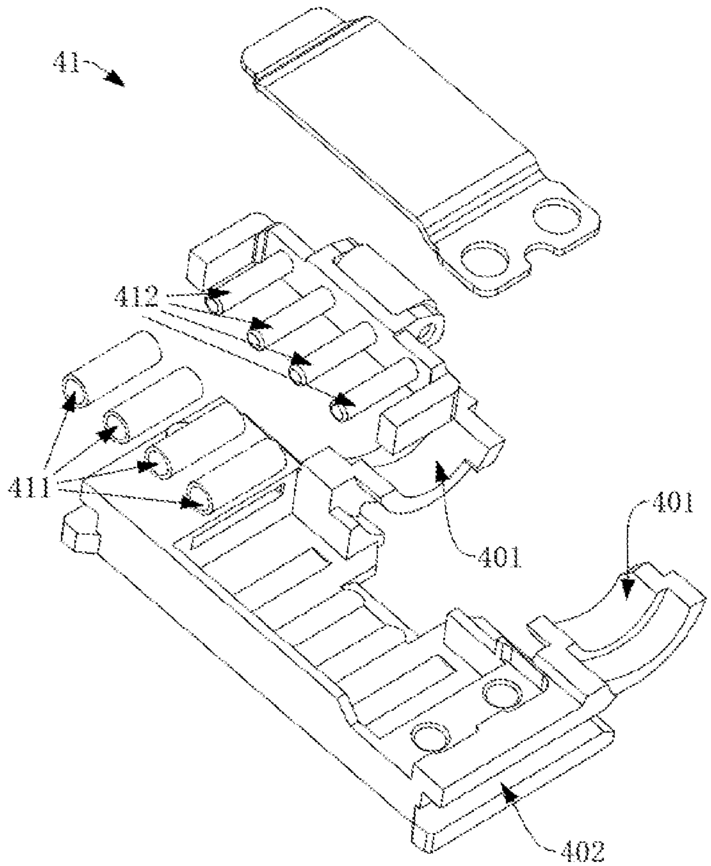
FIG. 36 is a schematic exploded view of a structure of a first rotating member in the first rotating arm shown in FIG. 7.
Figure 37:
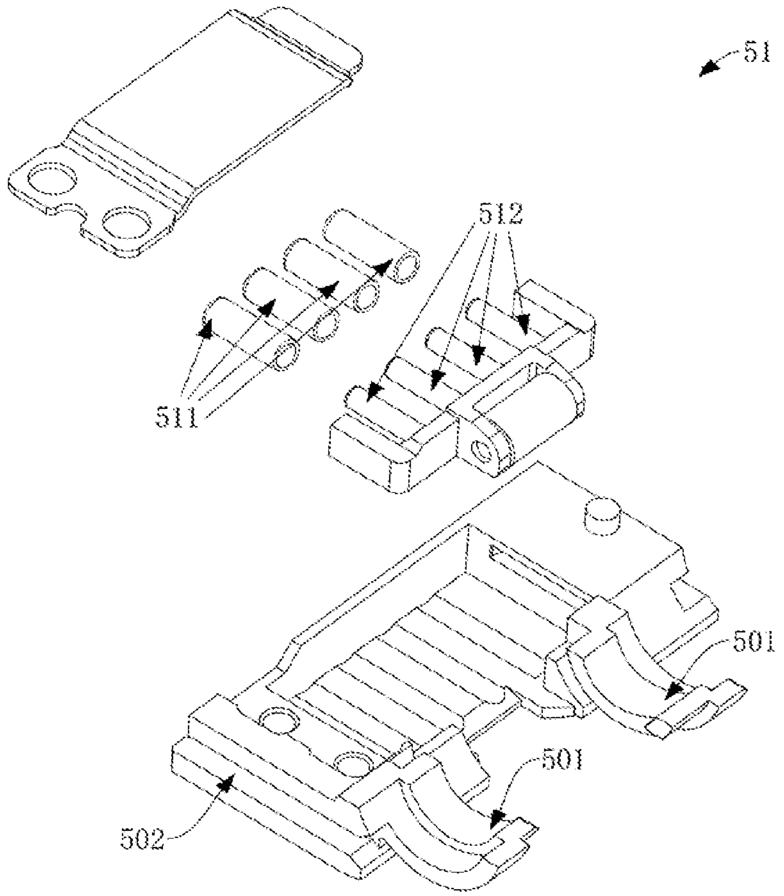
FIG. 37 is a schematic exploded view of a structure of a second rotating member in the second rotating arm shown in FIG. 7.

Refer to FIG. 36 and FIG. 37. In an embodiment. FIG. 36 is a schematic exploded view of a structure of a first transmission member 41, and FIG. 37 is a schematic exploded view of a structure of a third transmission member 51.

In FIG. 36, the first transmission member 41 includes a plurality of first springs 411 and first spring shafts 412 configured to fasten the first springs 411. The first spring shafts 412 are disposed in a direction from the first rotating end 401 to the first sliding end 402, and each first spring 411 is sleeved on one first spring shaft 412, so that each first spring 411 abuts against the first rotating end 401 and the first sliding end 402. The first spring 411 is configured to provide elastic force for pushing the first rotating end 401 away from the first sliding end 402. The first spring 411 may form a damping effect on the first rotating arm 40. In this way, when the folding apparatus 100 is in the unfolded state, the first rotating arm 40 can be driven to rotate around the first rotating end 401 and relative to the main shaft assembly 30 only after damping force of the first spring 411 is overcome by specific external force.

In FIG. 37, the third transmission member 51 includes a plurality of second springs 511 and second spring shafts 512 configured to fasten the second springs 511. The second spring shafts 512 are disposed in a direction from the second rotating end 501 to the second sliding end 502, and each second spring 511 is sleeved on one second spring shaft 512, so that each second spring 511 abuts against the second rotating end 501 and the second sliding end 502. The second spring 511 is configured to provide elastic force for pushing the second rotating end 501 away from the second sliding end 502. The second spring 511 may form a damping effect on the second rotating arm 50. In this way, when the folding apparatus 100 is in the unfolded state, the second rotating arm 50) can be driven to rotate around the second rotating end 501 and relative to the main shaft assembly 30 only after damping force of the second spring 511 is overcome by specific external force.

Therefore, through joint function of the first spring 411 and the second spring 511, the folding apparatus 100 in this application may maintain a relatively stable posture in the unfolded state and is not easily flipped towards the folded state when the folding apparatus 100 is subject to external force. In this way, the user can continuously use the electronic device 200 in this application in the unfolded state. That is, the first spring 411 and the second spring 511 may jointly maintain a stable posture of the electronic device 200.

Figure 38:
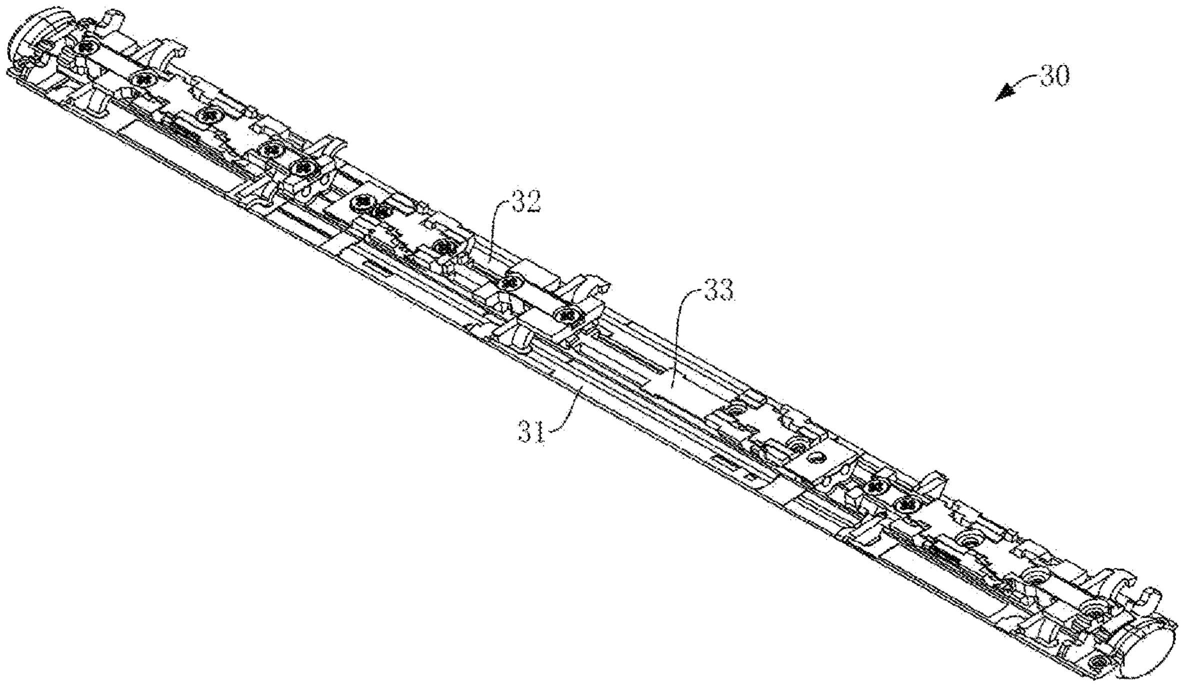
FIG. 38 is a schematic diagram of a structure of a main shaft assembly in the rotating mechanism shown in FIG. 5.
Figure 39:
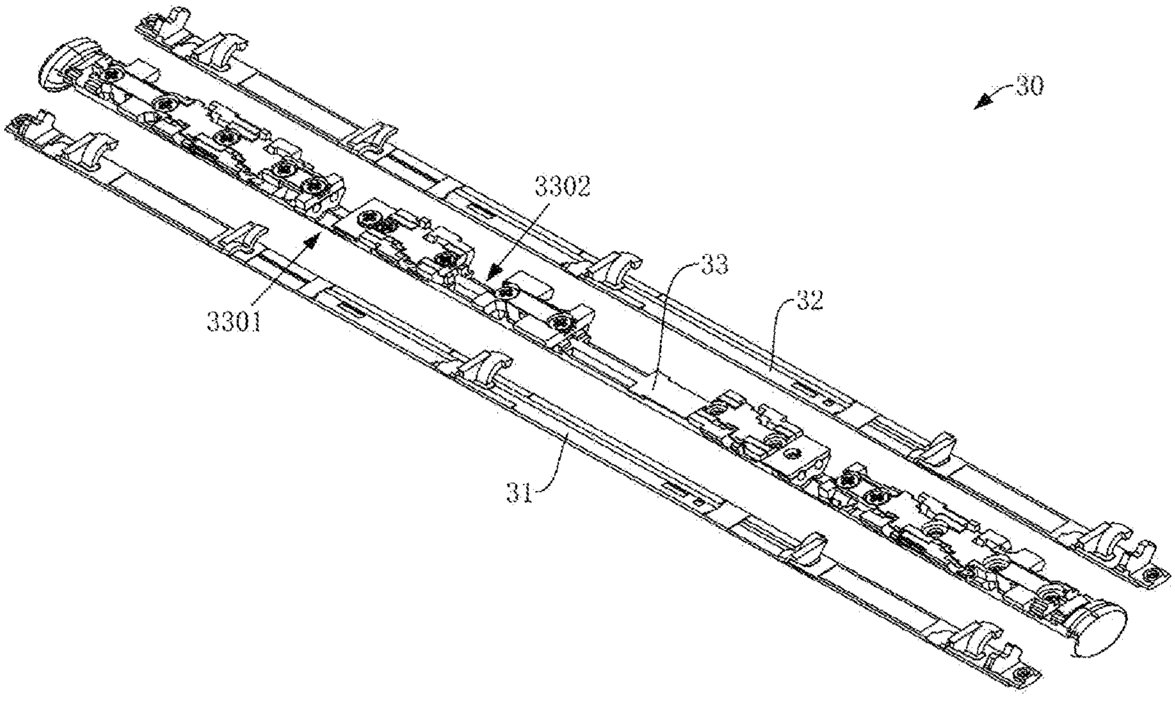
FIG. 39 is a schematic exploded view of a structure of a main shaft assembly in the rotating mechanism shown in FIG. 38.

Refer to FIG. 38 and FIG. 39. In an embodiment, the main shaft assembly 30 in this application includes a central shaft plate 33, a first side shaft plate 31, and a second side shaft plate 32. The first side shaft plate 31 and the second side shaft plate 32 are respectively disposed on two opposite sides of the central shaft plate 33, the first side shaft plate 31 is located between the central shaft plate 33 and the first transmission arm 10, and the second side shaft plate 32 is located between the central shaft plate 33 and the second transmission arm 20. Further, the first side shaft plate 31 and the second side shaft plate 32 are rotatably connected to the central shaft plate 33, one side that is of the first side shaft plate 31 and that is away from the central shaft plate 33 is rotatably connected to the first transmission arm 10, and one side that is of the second side shaft plate 32 and that is away from the central shaft plate 33 is rotatably connected to the second transmission arm 20).

Therefore, when the folding apparatus 100 in this application is in the folded state, the first side shaft plate 31 and the second side shaft plate 32 further rotate relative to the central shaft plate 33, and are respectively connected between the central shaft plate 33 and the first transmission arm 10 and between the central shaft plate 33 and the second transmission arm 20. Disposing the first side shaft plate 31 and the second side shaft plate 32 increases a bend radius of the main shaft assembly 30. When the first housing 110 and the second housing 120 are folded relative to each other, shape thicknesses of the first housing 110 and the second housing 120 are accommodated, so that the folding apparatus 100 in the folded state can provide a relatively flat outer side surface A. In this case, the outer side surface A is U-shaped, and may better carry the flexible display 210.

Figure 40:
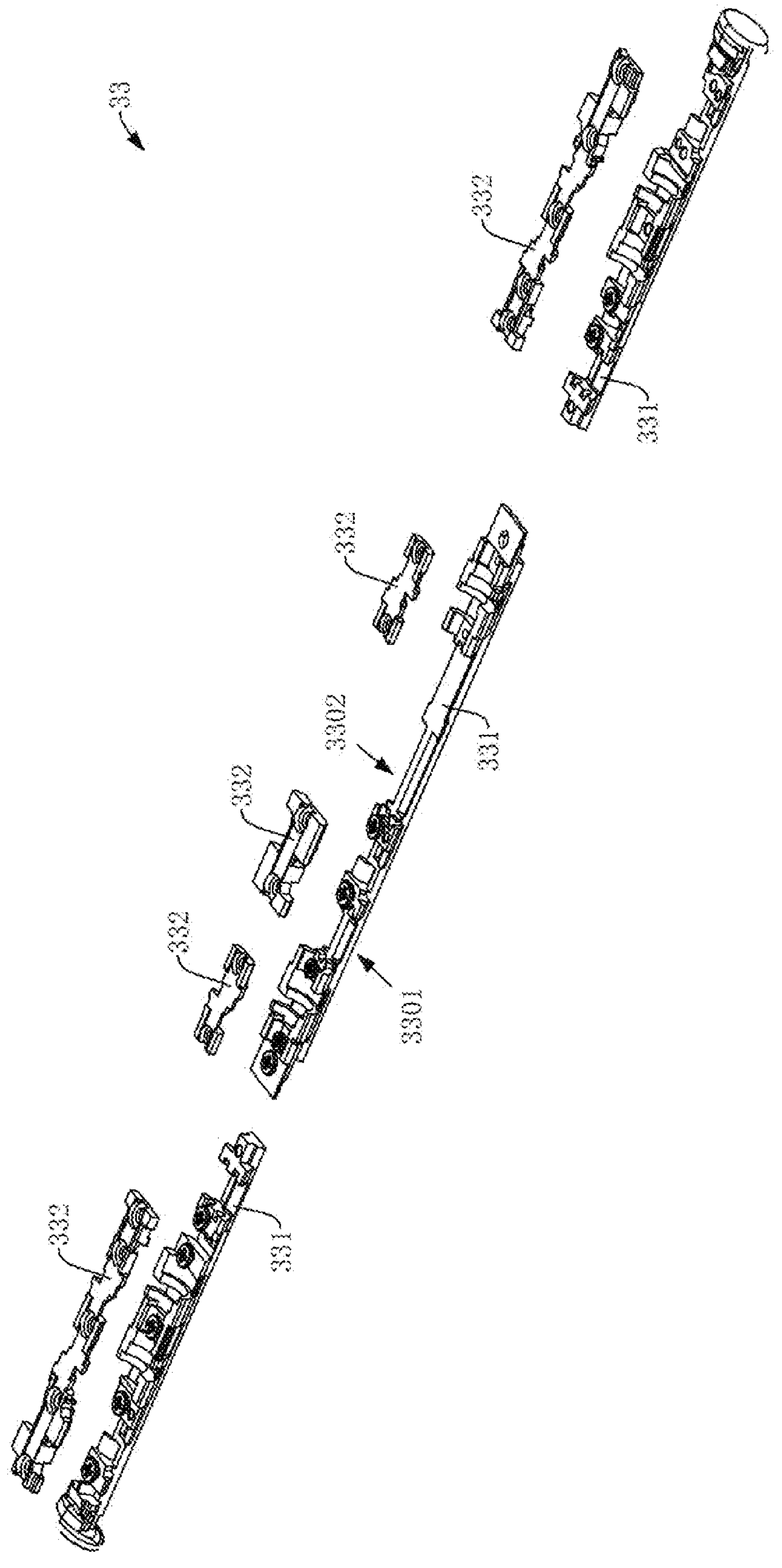
FIG. 40 is a schematic exploded view of a structure of a central shaft plate in the main shaft assembly shown in FIG. 38.

Refer to FIG. 40. In an embodiment, the central shaft plate 33 includes a central inner plate 331 and a central outer plate 332. The central outer plate 332 is located on a side close to the inner side surface B, and the central inner plate 331 is located on a side close to the outer side surface A. The central outer plate 332 is fastened on the central inner plate 331, and the central outer plate 332 and the central inner plate 331 are fixedly connected and form a structure with a plurality of arc grooves. Further, the central shaft plate 33 includes a first side edge 3301 and a second side edge 3302 that are opposite to each other. The first side edge 3301 is close to the first side shaft plate 31, and the second side edge 3302 is close to the second side shaft plate 32.

In the schematic diagram in FIG. 40, the central shaft plate 33 is further divided into a three-segment structure in the length direction of the main shaft assembly 30. The central inner plate 331 and the central outer plate 332 are respectively divided into three-segment structures (the central outer plate 332 in the middle segment is further divided into three sub-segments), each segment of the central inner plate 331 and one segment of the central outer plate 332 are fitted and fastened, and the heads and tails of the three-segment structure are spliced to form the central shaft plate 33. The central shaft plate 33 is of a structure divided into a plurality of segments, machining precision of the central inner plate 331 and the central outer plate 332 in each segment structure may be ensured, and overall precision of the central shaft plate 33 may be ensured after the heads and tails are spliced.

Figure 41:
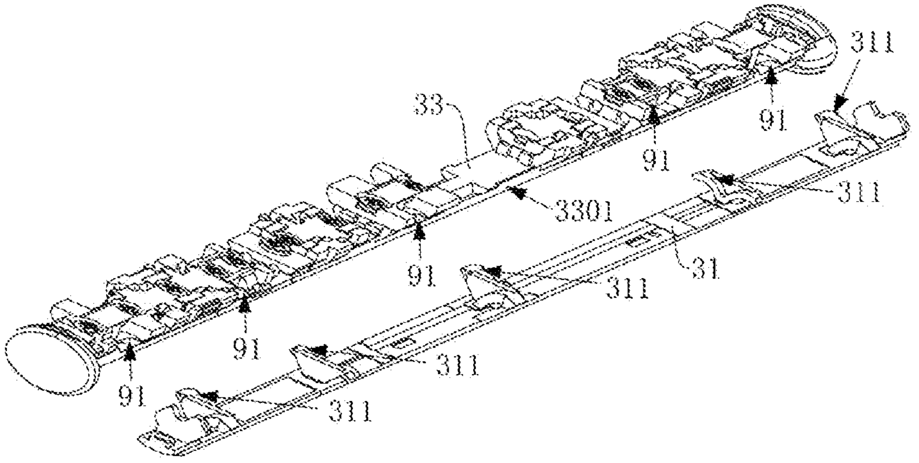
FIG. 41 is a schematic diagram of fitting between the central shaft plate in the main shaft assembly shown in FIG. 38 and a first side shaft plate.

Refer to FIG. 41. At the first side edge 3301, a plurality of first arc grooves 91 are formed on the central shaft plate 33 through fitting between the central inner plate 331 and the central outer plate 332. Correspondingly, a plurality of first arc slide rails 311 are disposed on the first side shaft plate 31 at positions corresponding to the first arc grooves 91. Each first arc slide rail 311 is extended into one first arc groove 91, so that the first side shaft plate 31 and the central shaft plate 33 are rotatably connected. By using a structure of fitting between the first arc slide rails 311 and the first arc grooves 91, the overall thickness of the main shaft assembly 30 may be compressed while rotatable connection is implemented. It may be understood that, in some other embodiments, the first side shaft plate 31 and the central shaft plate 33 may also be rotatably connected by using a structure of fitting between a rotating shaft and a shaft hole.

Figure 42:
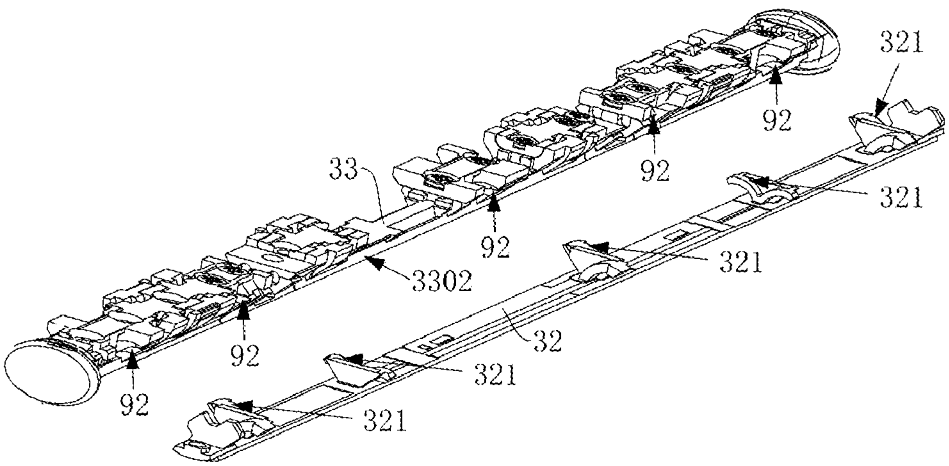
FIG. 42 is a schematic diagram of fitting between the central shaft plate in the main shaft assembly shown in FIG. 38 and a second side shaft plate.

At the second side edge 3302 shown in FIG. 42, a plurality of second arc grooves 92 are formed on the central shaft plate 33 through fitting between the central inner plate 331 and the central outer plate 332. Correspondingly: a plurality of second arc slide rails 321 are disposed on the second side shaft plate 32 at positions corresponding to the second arc grooves 92. Each second arc slide rail 321 is extended into one second arc groove 92, so that the second side shaft plate 32 and the central shaft plate 33 are rotatably connected. It may be understood that, in some other embodiments, the second side shaft plate 32 and the central shaft plate 33 may also be rotatably connected by using the structure of fitting between a rotating shaft and a shaft hole.

Figure 43:
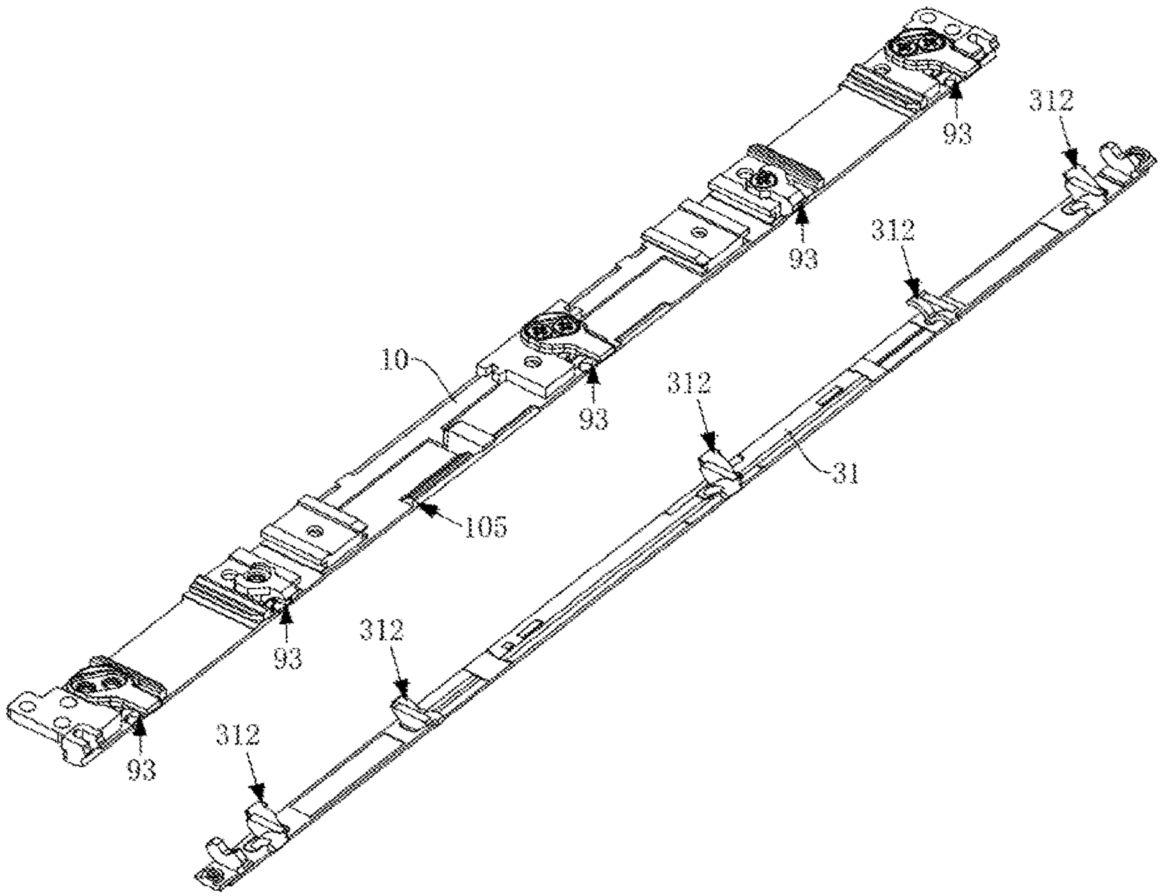
FIG. 43 is a schematic diagram of fitting between the first side shaft plate shown in FIG. 38 and a first transmission arm.
Figure 44:
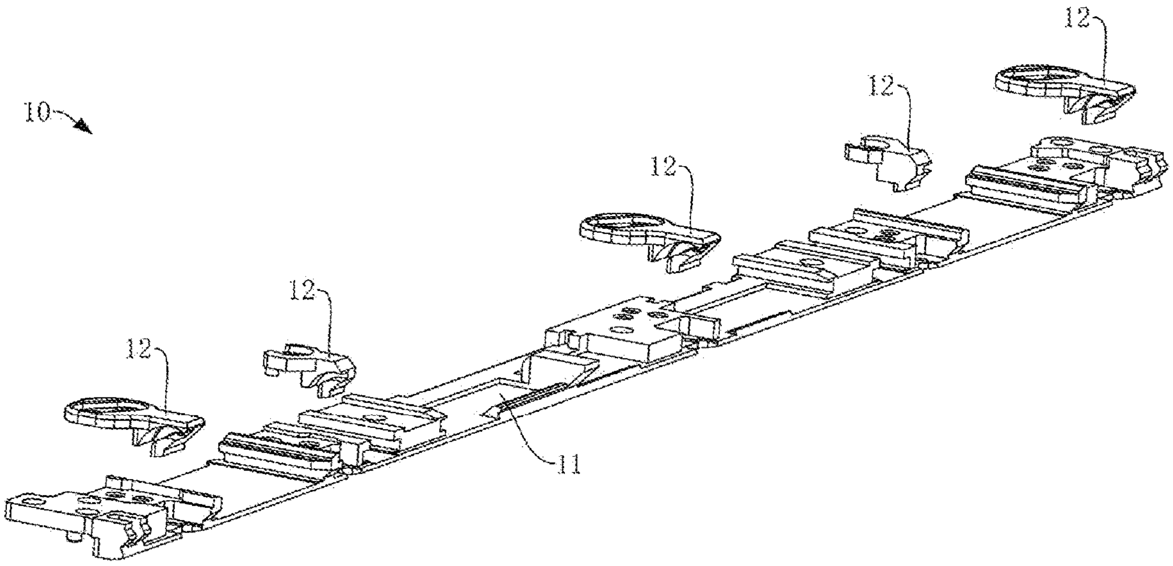
FIG. 44 is a schematic exploded view of a structure of the first transmission arm shown in FIG. 43.

Refer to a schematic diagram in FIG. 43. On a side of the first side shaft plate 31 and the first transmission arm 10, the first transmission arm 10 includes a third side edge 105 close to the first side shaft plate 31. In addition, a plurality of third arc grooves 93 are formed on the third side edge 105 of the first transmission arm 10. For details, refer to FIG. 44. The first transmission arm 10 includes a first transmission inner plate 11 and a first transmission outer plate 12. The first transmission inner plate 11 and the first transmission outer plate 12 are fixedly connected to each other, to form the foregoing plurality of third arc grooves 93. It may be understood that the third arc groove 93 herein is the first rotating portion 101 of the first transmission arm 10. In other words, in this embodiment, the first rotating portion 101 of the first transmission arm 10 is constructed into a shape of the third arc groove 93. In addition, to ensure size precision of each third arc groove 93, the first transmission outer plate 12 is further divided into a plurality of first transmission outer plates 12. When each first transmission outer plate 12 is fastened on the first transmission inner plate 11, one third arc groove 93 is formed.

Correspondingly, a plurality of third arc slide rails 312 are disposed on the first side shaft plate 31 at positions corresponding to the third arc grooves 93. Each third arc slide rail 312 is extended into one third arc groove 93, so that the first side shaft plate 31 and the first transmission arm 10 are rotatably connected.

Figure 45:
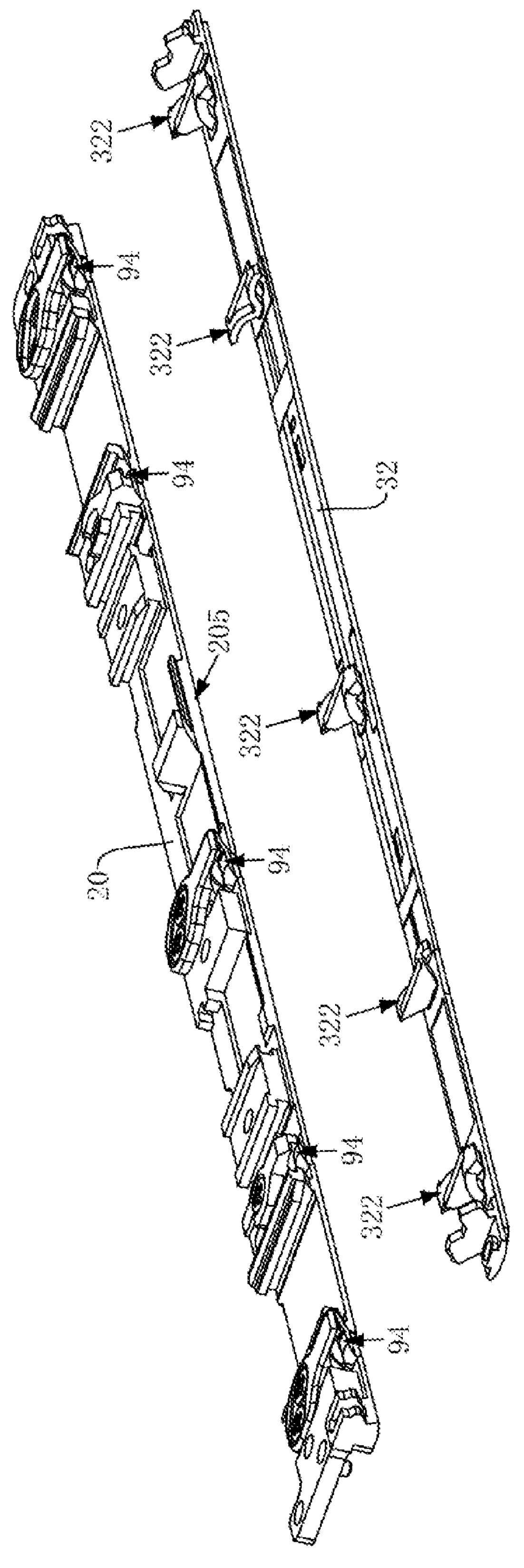
FIG. 45 is a schematic diagram of fitting between the second side shaft plate shown in FIG. 38 and a second transmission arm.
Figure 46:
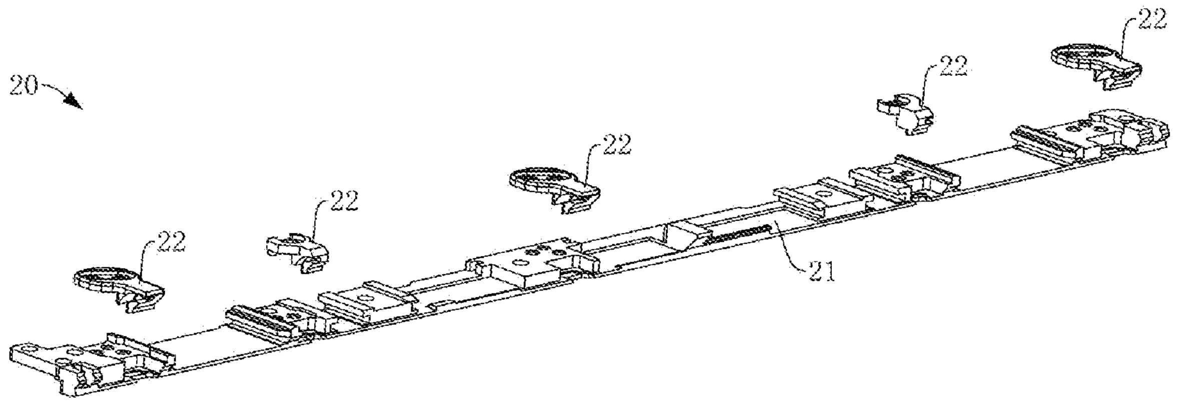
FIG. 46 is a schematic exploded view of a structure of the second transmission arm shown in FIG. 45.

Refer to FIG. 45. On one side of the second side shaft plate 32 and the second transmission arm 20, the second transmission arm 20 includes a fourth side edge 205 close to the second side shaft plate 32. In addition, a plurality of fourth arc grooves 94 are formed on the fourth side edge 205 of the second transmission arm 20. For details, refer to FIG. 46. The second transmission arm 20 includes a second transmission inner plate 21 and a second transmission outer plate 22. The second transmission inner plate 21 and the second transmission outer plate 22 are fixedly connected to each other, to form the foregoing plurality of fourth arc grooves 94. It may be understood that the fourth arc groove 94 herein is the second rotating portion 201 of the second transmission arm 20. In other words, in this embodiment, the second rotating portion 201 of the second transmission arm 20 is constructed into a shape of the fourth arc groove 94. In addition, to ensure size precision of each fourth arc groove 94, the second transmission outer plate 22 is also divided into a plurality of second transmission outer plates 22. When each second transmission outer plate 22 is fastened on the second transmission inner plate 21, one fourth arc groove 94 is formed.

Correspondingly, a plurality of fourth arc slide rails 322 are disposed on the second side shaft plate 32 at positions corresponding to the fourth arc grooves 94. Each fourth arc slide rail 322 is extended into one fourth arc groove 94, so that the second side shaft plate 32 and the second transmission arm 20 are rotatably connected.

Similar to the foregoing reasons, through fitting between the third arc groove 93 and the third arc slide rail 312 and fitting between the fourth arc groove 94 and the fourth arc slide rail 322, the overall thickness of the main shaft assembly 30 may also be compressed. In addition, the structure of fitting between a rotating shaft and a shaft hole may be used to rotatably connect the first side shaft plate 31 and the first transmission arm 10 and rotatably connect the second side shaft plate 32 and the second transmission arm 20.

Figure 47:
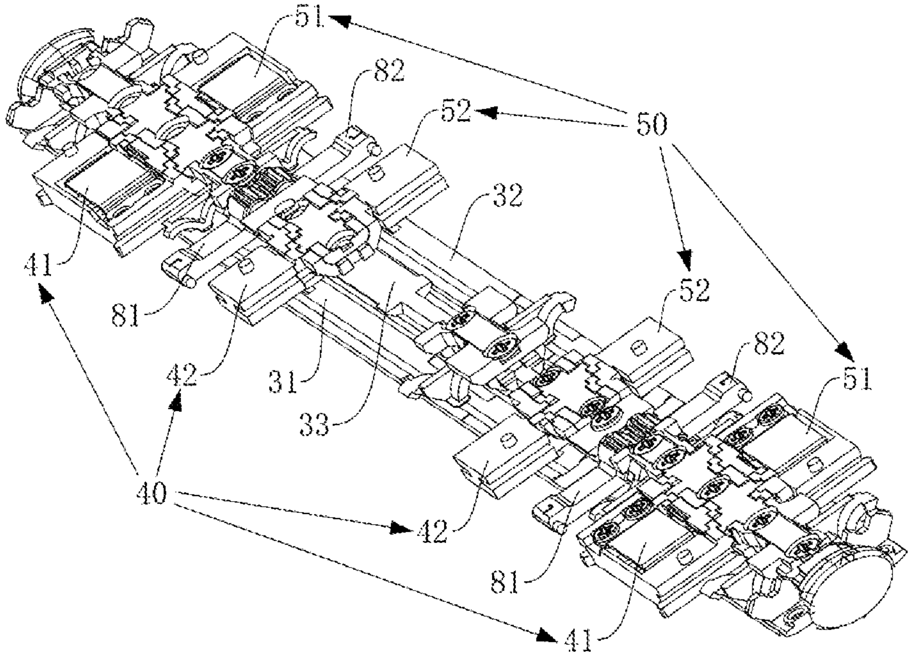
FIG. 47 is a schematic diagram of fitting between the first rotating arm or the second rotating arm in the rotating mechanism shown in FIG. 5 and a main shaft assembly.
Figure 48:
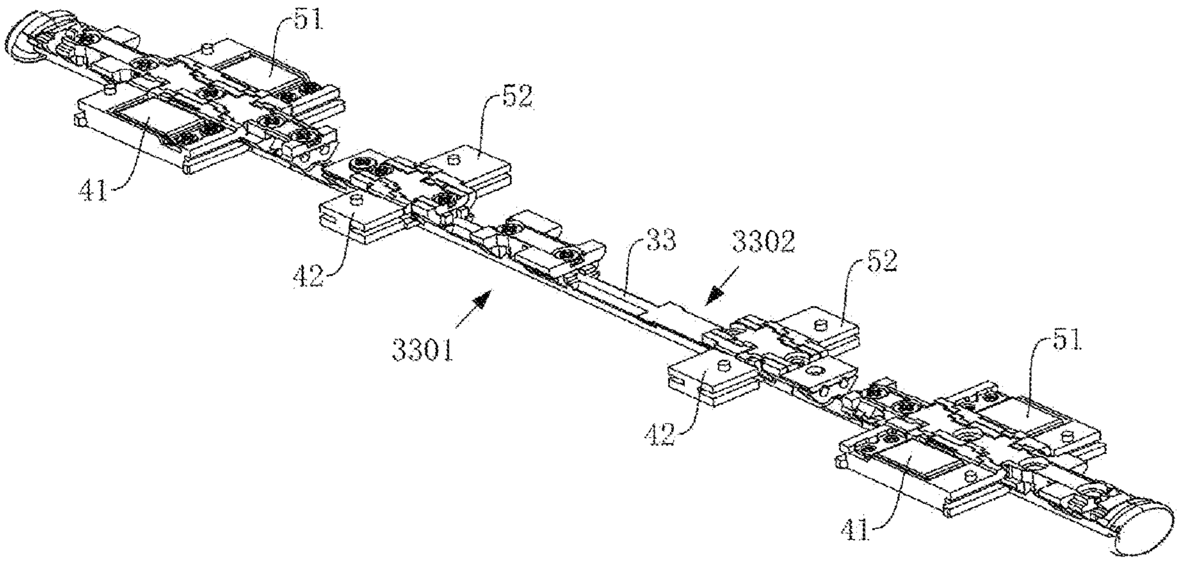
FIG. 48 is a schematic diagram of fitting between the first rotating arm or the second rotating arm shown in FIG. 47 and a central shaft plate.

Refer to FIG. 47 and FIG. 48. In an embodiment, both the first rotating arm 40 and the second rotating arm 50 are rotatably connected to the central shaft plate 33, so that both the first rotating arm 40 and the second rotating arm 50 are rotatably connected to the main shaft assembly 30. Specifically, as mentioned above, the central outer plate 332 is fastened on the central inner plate 331, and the central outer plate 332 and the central inner plate 331 are fixedly connected and form a structure of a plurality of arc grooves in the central shaft plate 33. The structure of arc grooves may be further used to rotatably connect the central shaft plate 33 to the first rotating arm 40) and the second rotating arm 50.

Figure 49:
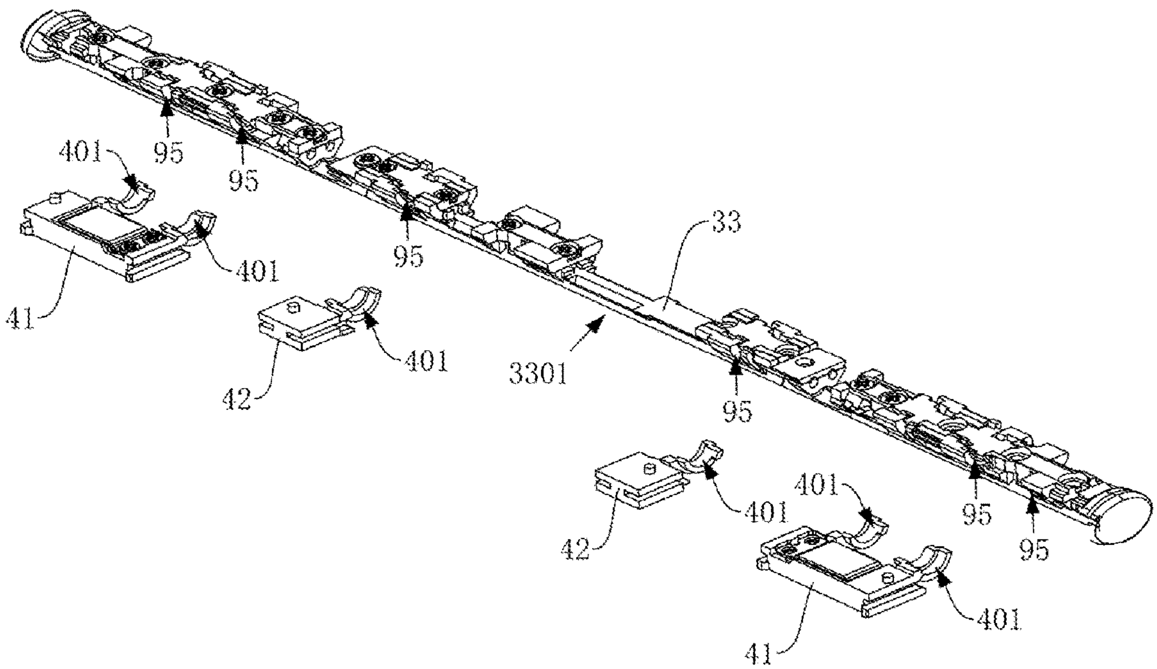
FIG. 49 is a schematic exploded view of fitting between the first rotating arm and the central shaft plate shown in FIG. 47.
Figure 50:
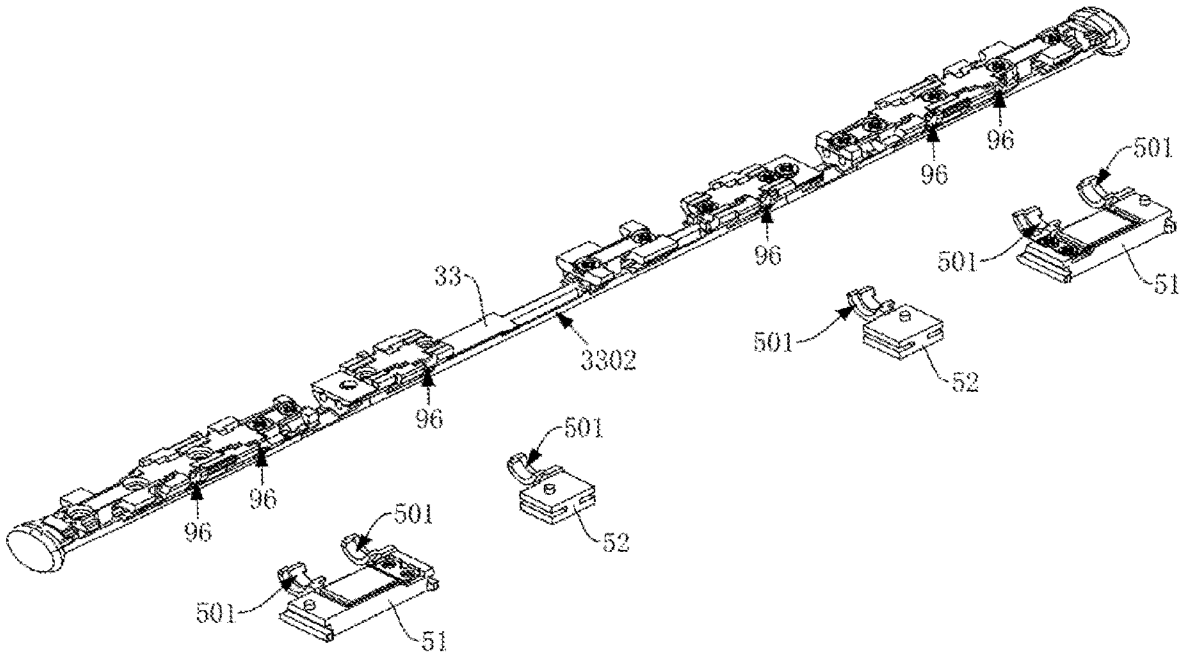
FIG. 50 is a schematic exploded view of fitting between the second rotating arm and the central shaft plate shown in FIG. 47.

Refer to FIG. 49. The first side edge 3301 of the central shaft plate 33 further includes a plurality of fifth arc grooves 95, and correspondingly the first rotating ends 401 of the first rotating arm 40 are constructed as a plurality of fifth arc slide rails. Each fifth arc slide rail is extended into one fifth arc groove 95, so that the first rotating end 401 and the central shaft plate 33 are rotatably connected. In FIG. 50, the second side edge 3302 of the central shaft plate 33 further includes a plurality of sixth arc grooves 96, and correspondingly the second rotating ends 501 of the second rotating arm 50 are constructed as a plurality of sixth arc slide rails. Each sixth arc slide rail is extended into one sixth arc groove 96, so that the second rotating end 501 and the central shaft plate 33 are rotatably connected.

It may be understood that the overall thickness of the main shaft assembly 30 may also be compressed through a connection manner between the fifth arc groove 95 and the fifth arc slide rail and a connection manner between the sixth arc groove 96 and the sixth arc slide rail. In addition, in some other embodiments, the first rotating arm 40 and the second rotating arm 50 may also be rotatably connected to the central shaft plate 33 by using the structure of fitting between a rotating shaft and a shaft hole.

In addition, in the structure of fitting between the arc grooves and the arc slide rails, positions of the arc grooves and the arc slide rails may be exchanged. For example, in a structure in which a plurality of fifth arc slide rails are disposed on the first side edge 3301 of the central shaft plate 33, and correspondingly the first rotating end 401 is constructed as a structure of fifth arc grooves 95, rotatable connections between the foregoing parts may also be implemented. This is not particularly limited herein in this application, and may be specifically set and adjusted based on an internal structure of the rotating mechanism 130.

In the foregoing embodiments, positions of rotation axes for rotatable connections between parts are set differently. In addition, in a folding process of the folding apparatus 100, bend radii of the parts are different. Therefore, distances from rotation axes of rotatable connection positions to the geometric center of the central shaft plate 33 are also different.

For example, a rotation axis between the first side shaft plate 31 and the first transmission arm 10 and a rotation axis between the second side shaft plate 32 and the second transmission arm 20 have equal distances to the geometric center of the central shaft plate 33. In addition, distances from the rotation axis between the first side shaft plate 31 and the first transmission arm 10 and from the rotation axis between the second side shaft plate 32 and the second transmission arm 20 to the geometric center of the central shaft plate 33 are longer than distances from a rotation axis between the first side shaft plate 31 and the central shaft plate 33 and from a rotation axis between the second side shaft plate 32 and the central shaft plate 33 to the geometric center of the central shaft plate 33. Alternatively, the rotation axis between the first side shaft plate 31 and the central shaft plate 33 is located between the rotation axis between the first side shaft plate 31 and the first transmission arm 10, and the rotation axis between the second side shaft plate 32 and the central shaft plate 33 is located between the rotation axis between the second side shaft plate 32 and the second transmission arm 20. In this case, bend radii of the first transmission arm 10 and the second transmission arm 20 are larger than rotation radii of the first side shaft plate 31 and the second side shaft plate 32, and rotation angles of the first transmission arm 10) and the second transmission arm 20 are also larger than rotation angles of the first side shaft plate 31 and the second side shaft plate 32.

The rotation axis between the first rotating arm 40 and the central shaft plate 33 is located between the rotation axis between the first side shaft plate 31 and the central shaft plate 33, and the rotation axis between the second rotating arm 50 and the central shaft plate 33 is located between the rotation axis between the second side shaft plate 32 and the central shaft plate 33. In this case, rotation radii of the first rotating arm 40 and the second rotating arm 50 are smaller than rotation radii of the first side shaft plate 31 and the second side shaft plate 32. In addition, the rotation axis between the first rotating arm 40 and the central shaft plate 33 is located on a side close to the first transmission arm 10, and correspondingly, the rotation axis between the second rotating arm 50) and the central shaft plate 33 is located on a side close to the second transmission arm 20.

The foregoing descriptions are merely specific embodiments of this application, but are not intended to limit the protection scope of this application. Any variation or replacement, for example, reducing or adding a structural member, and changing a shape of a structural member, readily figured out by a person skilled in the art within the technical scope disclosed in this application shall fall within the protection scope of this application. When no conflict occurs, embodiments of this application and the features in the embodiments may be mutually combined. Therefore, the protection scope of this application shall be subject to the protection scope of the claims.

What is claimed is:

1. A rotating mechanism comprises a main shaft assembly, a first transmission arm, a first rotating arm, a first shielding member, a second transmission arm, a second rotating arm, and a second shielding member; wherein:

one end of the first transmission arm is rotatably connected to the main shaft assembly;

the first rotating arm comprises a first rotating end and a first sliding end, wherein the first rotating end is rotatably connected to the main shaft assembly, and the first sliding end is slidably connected to the first transmission arm;

the first shielding member is located on a side that is of the first rotating arm and that is away from the first transmission arm, and the first shielding member is fixedly connected to the first sliding end;

one end of the second transmission arm is rotatably connected to the main shaft assembly;

the second rotating arm comprises a second rotating end and a second sliding end, wherein the second rotating end is rotatably connected to the main shaft assembly, and the second sliding end is slidably connected to the second transmission arm;

the second shielding member is located on a side that is of the second rotating arm and that is away from the second transmission arm, and the second shielding member is fixedly connected to the second sliding end; and when the rotating mechanism is unfolded, the first sliding end and the second sliding end each slide towards the main shaft assembly, and the first shielding member and the second shielding member approach each other to shield the main shaft assembly.

2. The rotating mechanism according to claim 1, wherein:

the first rotating arm comprises a first rotating member and a second rotating member, wherein the first rotating member and the second rotating member are disposed at an interval in a length direction of the main shaft assembly, and the first shielding member is fixedly connected to both the first rotating member and the second rotating member; and the second rotating arm comprises a third rotating member and a fourth rotating member, wherein the third rotating member and the fourth rotating member are disposed at an interval in the length direction of the main shaft assembly, and the second shielding member is fixedly connected to both the third rotating member and the fourth rotating member.

3. The rotating mechanism according to claim 2, wherein:

the first rotating member comprises a first spring, wherein two opposite ends of the first spring respectively abut against the first rotating end and the first sliding end, and the first spring is configured to push the first sliding end away from the first rotating end; and the third rotating member comprises a second spring, wherein two opposite ends of the second spring respectively abut against the second rotating end and the second sliding end, and the second spring is configured to push the second sliding end away from the second rotating end.

4. The rotating mechanism according to claim 2, wherein the rotating mechanism further comprises a first meshing member and a second meshing member, and wherein:

the first meshing member is located between the first shielding member and the first transmission arm, wherein the first meshing member comprises a third sliding end and a first meshing end that are opposite to each other, and the third sliding end is slidably connected to the first transmission arm;

the second meshing member is located between the second shielding member and the second transmission arm, wherein the second meshing member comprises a fourth sliding end and a second meshing end that are opposite to each other, and the fourth sliding end is slidably connected to the second transmission arm; and the first meshing end and the second meshing end are meshed with each other.

5. The rotating mechanism according to claim 2, wherein:

the first shielding member comprises a first fastener and a first cover plate, wherein the first fastener is fixedly connected to both the first rotating member and the second rotating member, and the first cover plate is located on a side that is of the first fastener and that is away from the first rotating member, and wherein the first cover plate is fixedly connected to the first fastener; and the second shielding member comprises a second fastener and a second cover plate, wherein the second fastener is fixedly connected to both the third rotating member and the fourth rotating member, and the second cover plate is located on a side that is of the second fastener and that is away from the third rotating member, and wherein the second cover plate is fixedly connected to the second fastener.

6. The rotating mechanism according to claim 1, wherein the main shaft assembly comprises a central shaft plate and a first side shaft plate and a second side shaft plate respectively disposed on two sides of the central shaft plate, wherein the first side shaft plate is connected between the central shaft plate and the first transmission arm, and the second side shaft plate is connected between the central shaft plate and the second transmission arm.

7. The rotating mechanism according to claim 6, wherein:

the first side shaft plate is rotatably connected to the central shaft plate, wherein a rotation center of the first side shaft plate is close to the first transmission arm and is away from the second side shaft plate; and the second side shaft plate is rotatably connected to the central shaft plate, wherein a rotation center of the second side shaft plate is close to the second transmission arm and is away from the first side shaft plate.

8. The rotating mechanism according to claim 6, wherein:

the first rotating arm is rotatably connected to the central shaft plate, wherein a rotation center of the first rotating arm is close to the first transmission arm and is away from the second transmission arm; and the second rotating arm is rotatably connected to the central shaft plate, wherein a rotation center of the second rotating arm is close to the second transmission arm and is away from the first transmission arm.

9. The rotating mechanism according to claim 6, wherein:

a rotatable connection is implemented in at least one of the following configurations:

between the first side shaft plate and the central shaft plate;

between the second side shaft plate and the central shaft plate;

between the first rotating arm and the central shaft plate;

between the second rotating arm and the central shaft plate through fitting between arc grooves and arc slide rails; or the rotatable connection is implemented through fitting of pins.

10. An electronic device, comprising a first housing, a rotating mechanism, and a second housing that are sequentially connected, wherein the rotating mechanism is capable of deforming, wherein the first housing and the second housing are configured to be folded or unfolded relative to each other during the deforming; and wherein the electronic device further comprises a flexible display, wherein the flexible display is located on a side that is of a main shaft assembly and that is away from a first shielding member and a second shielding member; wherein the rotating mechanism comprises a main shaft assembly, a first transmission arm, a first rotating arm, a first shielding member, a second transmission arm, a second rotating arm, and a second shielding member; and wherein:

one end of the first transmission arm is rotatably connected to the main shaft assembly;

the first rotating arm comprises a first rotating end and a first sliding end, wherein the first rotating end is rotatably connected to the main shaft assembly, and the first sliding end is slidably connected to the first transmission arm;

the first shielding member is located on a side that is of the first rotating arm and that is away from the first transmission arm, wherein the first shielding member is fixedly connected to the first sliding end;

one end of the second transmission arm is rotatably connected to the main shaft assembly;

the second rotating arm comprises a second rotating end and a second sliding end, wherein the second rotating end is rotatably connected to the main shaft assembly, and the second sliding end is slidably connected to the second transmission arm, and the second shielding member is located on a side that is of the second rotating arm and that is away from the second transmission arm, wherein the second shielding member is fixedly connected to the second sliding end; and when the first housing and the second housing are unfolded relative to each other, the first sliding end and the second sliding end each slide towards the main shaft assembly, and the first shielding member and the second shielding member approach each other to shield the main shaft assembly.

11. The electronic device according to claim 10, wherein:

the first rotating arm comprises a first rotating member and a second rotating member, wherein the first rotating member and the second rotating member are disposed at an interval in a length direction of the main shaft assembly, and the first shielding member is fixedly connected to both the first rotating member and the second rotating member; and the second rotating arm comprises a third rotating member and a fourth rotating member, wherein the third rotating member and the fourth rotating member are disposed at an interval in the length direction of the main shaft assembly, and the second shielding member is fixedly connected to both the third rotating member and the fourth rotating member.

12. The rotating mechanism according to claim 11, wherein:

the first rotating member comprises a first spring, wherein two opposite ends of the first spring respectively abut against the first rotating end and the first sliding end, and the first spring is configured to push the first sliding end away from the first rotating end; and the third rotating member comprises a second spring, wherein two opposite ends of the second spring respectively abut against the second rotating end and the second sliding end, and the second spring is configured to push the second sliding end away from the second rotating end.

13. The rotating mechanism according to claim 11, wherein the rotating mechanism further comprises a first meshing member and a second meshing member, and wherein the first meshing member is located between the first shielding member and the first transmission arm, wherein the first meshing member comprises a third sliding end and a first meshing end that are opposite to each other, and the third sliding end is slidably connected to the first transmission arm;

the second meshing member is located between the second shielding member and the second transmission arm, wherein the second meshing member comprises a fourth sliding end and a second meshing end that are opposite to each other, and the fourth sliding end is slidably connected to the second transmission arm; and the first meshing end and the second meshing end are meshed with each other.

14. The rotating mechanism according to claim 11, wherein:

the first shielding member comprises a first fastener and a first cover plate, wherein the first fastener is fixedly connected to both the first rotating member and the second rotating member, and the first cover plate is located on a side that is of the first fastener and that is away from the first rotating member, and wherein the first cover plate is fixedly connected to the first fastener; and the second shielding member comprises a second fastener and a second cover plate, wherein the second fastener is fixedly connected to both the third rotating member and the fourth rotating member, and the second cover plate is located on a side that is of the second fastener and that is away from the third rotating member, and wherein the second cover plate is fixedly connected to the second fastener.

15. The rotating mechanism according to claim 10, wherein the main shaft assembly comprises a central shaft plate and a first side shaft plate and a second side shaft plate respectively disposed on two sides of the central shaft plate, wherein the first side shaft plate is connected between the central shaft plate and the first transmission arm, and the second side shaft plate is connected between the central shaft plate and the second transmission arm.

16. The rotating mechanism according to claim 15, wherein:

the first side shaft plate is rotatably connected to the central shaft plate, wherein a rotation center of the first side shaft plate is close to the first transmission arm and is away from the second side shaft plate; and the second side shaft plate is rotatably connected to the central shaft plate, wherein a rotation center of the second side shaft plate is close to the second transmission arm and is away from the first side shaft plate.

17. The rotating mechanism according to claim 15, wherein:

the first rotating arm is rotatably connected to the central shaft plate, wherein a rotation center of the first rotating arm is close to the first transmission arm and is away from the second transmission arm; and the second rotating arm is rotatably connected to the central shaft plate, wherein a rotation center of the second rotating arm is close to the second transmission arm and is away from the first transmission arm.

18. The rotating mechanism according to claim 15, wherein a rotatable connection is implemented in at least one of the following configurations:

between the first side shaft plate and the central shaft plate, and/or between the second side shaft plate and the central shaft plate, and/or between the first rotating arm and the central shaft plate, and/or between the second rotating arm and the central shaft plate through fitting between arc grooves and arc slide rails; or the rotatable connection is implemented through fitting of pins.

* * * * *